United States Patent
Nakagawa

(10) Patent No.: US 11,435,973 B2
(45) Date of Patent: Sep. 6, 2022

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/986,340

(22) Filed: May 22, 2018

(65) Prior Publication Data

US 2018/0341453 A1    Nov. 29, 2018

(30) Foreign Application Priority Data

May 26, 2017  (JP) .............................. JP2017-104186

(51) Int. Cl.
| | | |
|---|---|---|
| G06F 3/14 | (2006.01) | |
| G06F 3/0484 | (2022.01) | |
| G06F 3/16 | (2006.01) | |
| H04M 1/72415 | (2021.01) | |
| H04M 1/72412 | (2021.01) | |
| G06F 3/00 | (2006.01) | |

(Continued)

(52) U.S. Cl.
CPC .......... *G06F 3/1454* (2013.01); *G06F 3/0484* (2013.01); *G06F 3/165* (2013.01); *H04M 1/72412* (2021.01); *H04M 1/72415* (2021.01); *G06F 3/0488* (2013.01); *G06F 3/16* (2013.01); *G09G 2354/00* (2013.01); *H04W 84/12* (2013.01)

(58) Field of Classification Search
CPC ...... G06F 3/1454; G06F 3/0484; G06F 3/165; G06F 3/0488; G06F 3/16; H04M 1/7253; H04M 1/72533; H04M 1/72412; H04M 1/72415; G09G 2354/00; H04W 84/12
USPC .......................................................... 715/716
See application file for complete search history.

(56) References Cited

U.S. PATENT DOCUMENTS

| | | | | |
|---|---|---|---|---|
| 8,196,042 B2* | 6/2012 | Hinckley | ............ | G06F 3/04883 715/708 |
| 8,260,933 B2* | 9/2012 | Park | .................. | H04N 21/41407 709/227 |

(Continued)

FOREIGN PATENT DOCUMENTS

| | | |
|---|---|---|
| CN | 102638610 A | 8/2012 |
| CN | 103023964 A | 4/2013 |

(Continued)

OTHER PUBLICATIONS

Go et al., Reliable and Energy-Efficient Hybrid Screen Mirroring Multicast System, IEEE 2018, pp. 433-446. (Year: 2018).*

*Primary Examiner* — Nicholas Augustine
(74) *Attorney, Agent, or Firm* — Canon U.S.A., Inc. I.P. Division

(57) ABSTRACT

In a case where a communication apparatus to which a user operation is input displays in a display area an image displayed on another communication apparatus, coordinate information corresponding to a coordinate indicating a position specified by the user operation on the image displayed in the display area is transmitted. Further, in a case where an image related to data stored in the another communication apparatus or an external device is displayed in the display area, control information based on the user operation is transmitted.

18 Claims, 8 Drawing Sheets

(51) Int. Cl.
*G06F 3/0488* (2022.01)
*H04W 84/12* (2009.01)

(56) References Cited

U.S. PATENT DOCUMENTS

| | | | | |
|---|---|---|---|---|
| 8,698,956 B2* | 4/2014 | Kondo | | G09G 5/006 |
| | | | | 348/231.99 |
| 10,298,830 B2* | 5/2019 | Iwasaki | | G06F 3/005 |
| 10,579,201 B2* | 3/2020 | Lee | | H04N 21/42204 |
| 2012/0208466 A1 | 8/2012 | Park | | |
| 2013/0013743 A1* | 1/2013 | Sasakura | | G06Q 30/0241 |
| | | | | 709/219 |
| 2013/0019173 A1* | 1/2013 | Kotler | | G06F 3/04883 |
| | | | | 715/834 |
| 2013/0019174 A1* | 1/2013 | Gil | | G06F 3/0481 |
| | | | | 715/711 |
| 2013/0019175 A1* | 1/2013 | Kotler | | G06F 3/0482 |
| | | | | 715/728 |
| 2013/0019182 A1* | 1/2013 | Gil | | G06F 3/0482 |
| | | | | 715/834 |
| 2013/0019208 A1* | 1/2013 | Kotler | | G06F 3/04895 |
| | | | | 715/835 |
| 2013/0086056 A1* | 4/2013 | Dyor | | G06F 16/9535 |
| | | | | 715/728 |
| 2013/0132904 A1* | 5/2013 | Primiani | | G06F 3/0482 |
| | | | | 715/834 |
| 2013/0174093 A1* | 7/2013 | Peters | | G06Q 10/101 |
| | | | | 715/834 |
| 2013/0191563 A1* | 7/2013 | Toba | | G06F 13/38 |
| | | | | 710/62 |
| 2013/0191781 A1* | 7/2013 | Radakovitz | | G06F 9/451 |
| | | | | 715/810 |
| 2013/0304794 A1* | 11/2013 | Verma | | H04N 21/47205 |
| | | | | 709/201 |
| 2014/0009394 A1* | 1/2014 | Lee | | G09G 5/14 |
| | | | | 345/157 |
| 2014/0165003 A1* | 6/2014 | Branton | | G06F 3/04817 |
| | | | | 715/835 |
| 2014/0195979 A1* | 7/2014 | Branton | | G06F 3/0488 |
| | | | | 715/810 |
| 2015/0002369 A1* | 1/2015 | Araki | | G06F 3/1454 |
| | | | | 345/1.1 |
| 2015/0061972 A1* | 3/2015 | Seo | | H04M 1/7253 |
| | | | | 345/2.3 |
| 2016/0150177 A1* | 5/2016 | Minemura | | H04N 21/436 |
| | | | | 348/564 |
| 2016/0239250 A1* | 8/2016 | Kim | | G06F 3/1454 |
| 2016/0253142 A1* | 9/2016 | Choi | | G06F 3/1454 |
| | | | | 345/1.3 |
| 2016/0353425 A1* | 12/2016 | Iwami | | H04N 21/436 |
| 2017/0026505 A1* | 1/2017 | Yoshimura | | H04N 21/436 |
| 2017/0255304 A1* | 9/2017 | Lee | | H04N 21/4126 |
| 2017/0332134 A1* | 11/2017 | Iwami | | H04N 21/436 |
| 2017/0374412 A1* | 12/2017 | Park | | H04L 65/4084 |
| 2018/0004696 A1* | 1/2018 | Lee | | G06F 13/4022 |
| 2018/0070122 A1* | 3/2018 | Baek | | H04N 21/43637 |
| 2018/0074779 A1* | 3/2018 | Marquardt | | H04L 67/14 |

FOREIGN PATENT DOCUMENTS

| | | |
|---|---|---|
| CN | 103260070 A | 8/2013 |
| CN | 103369530 A | 10/2013 |
| CN | 103530032 A | 1/2014 |
| CN | 103873578 A | 6/2014 |
| CN | 104394127 A | 3/2015 |
| CN | 106063285 A | 10/2016 |
| CN | 106375479 A | 2/2017 |
| CN | 106550488 A | 3/2017 |
| EP | 3005755 A1 | 4/2016 |
| JP | 2015-510306 A | 4/2015 |
| JP | 2016-71638 A | 5/2016 |
| KR | 2014-0016473 A | 2/2014 |
| WO | 2013/145699 A1 | 10/2013 |

* cited by examiner

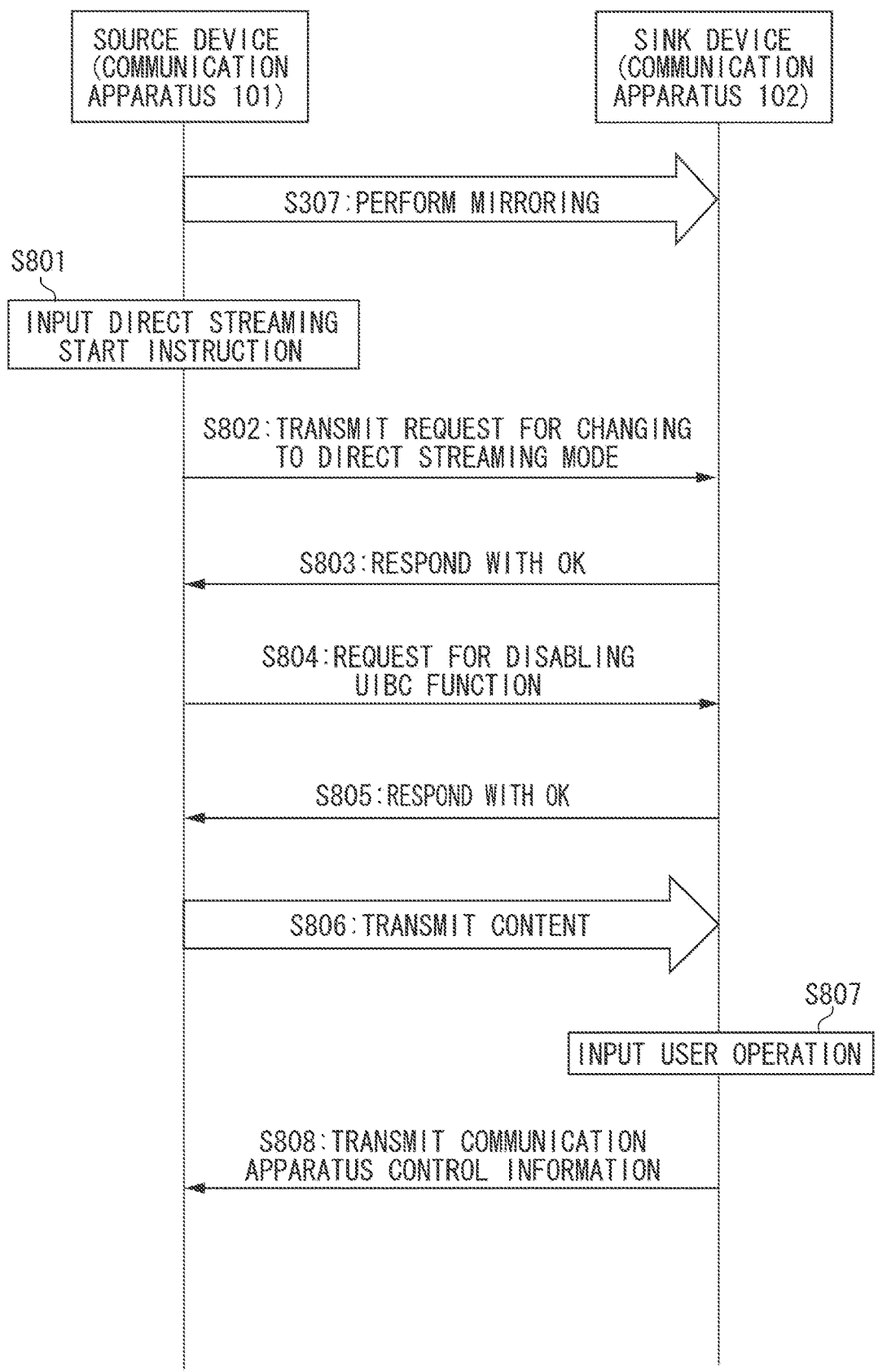

COMMUNICATION APPARATUS, COMMUNICATION METHOD, AND STORAGE MEDIUM

BACKGROUND

Field of the Disclosure

The present disclosure relates to a technique for transmitting information about user operations.

Description of the Related Art

In recent years, a technique for wirelessly mirroring screens displayed on a communication apparatus and/or audio reproduced by the communication apparatus are standardized as Wi-Fi Display (Miracast®). Mirroring is a technique that allows a transmission apparatus and a reception apparatus to share a screen displayed on the transmission apparatus and/or audio reproduced by the transmission apparatus by transmitting image data and/or audio data as information about the displayed screen and reproduced audio to the reception apparatus via a network. In Wi-Fi Display. A source device and a sink device are defined. The source device transmits image data and/or audio data as information about displayed screens and/or reproduced audio. The sink device receives the image data and/or audio data from the source device.

Further, a user input back channel (UIBC) function can be used in Wi-Fi Display. When the UIBC function is used, operation information is transmitted from the sink device to the source device to enable operations of the source device from the sink device. At this time, operation information input by the user via a keyboard, mouse, remote controller, etc. is transmitted as operation information from the sink device to the source device.

Japanese Patent Application Laid-Open No. 2016-71638 discusses the mirroring function described above and a content redirection function in which the sink device acquires data from an external device other than the source device and displays the data. In the content redirection function, the source device transmits to the sink device information about data stored in the external device, and the sink device acquires data from the external device and reproduces the data. Then, a mirroring mode in which mirroring is performed and a content redirection mode in which content redirection is performed are switched according to the data type, etc.

In the mirroring mode, if the UIBC function is used, the sink device transmits operation information including coordinate information about coordinates specified by the user operation to the source device based on an input user operation. Further, in the mirroring mode, images displayed on the source device and the sink device are the same. Therefore, if the source device performs processing based on the received operation information, the same user operation as the user operation input to the sink device is input at the coordinates corresponding to the coordinate information on the image displayed on the source device. Thus, the data reproduction by mirroring is controlled as intended by the user.

On the other hand, in the content redirection mode, even if the operation information including the coordinate information is transmitted to the external device as in the mirroring mode, the data reproduction cannot be controlled as intended by the user. This is because, when images displayed on the sink device and the external device are different or nothing is displayed on the external device, if the external device performs processing based on the received operation information, a different operation from the user-intended operation is performed. To control the data reproduction in the content redirection mode, the sink device needs to generate control information including information such as temporary data suspension based on the user operation and transmit the control information to the external device.

SUMMARY

The present disclosure is directed to a technique for transmitting appropriate information based on whether data received by a communication apparatus to which a user operation is input is data related to an image displayed on another communication apparatus or data stored in another communication apparatus or an external device.

According to an aspect of the present invention, a communication apparatus operable in a first operation mode in which data related to an image displayed at another communication apparatus is received and the image displayed at the another communication apparatus is displayed in a display area, and a second operation mode in which data stored in the another communication apparatus or an external device is received based on a user operation accepted by the another communication apparatus and an image which is related to the received data stored in the another communication apparatus or the external device is displayed in the display area, includes an acceptance unit configured to accept a user operation on the image displayed in the display area in the first operation mode or the second operation mode, and a transmission unit configured to transmit, when the user operation is accepted via the acceptance unit, a coordinate information corresponding to a coordinate indicating a position specified by the user operation on the image displayed in the display area in a case where the communication apparatus operates in the first operation mode, and a control information based on the user operation in a case where the communication apparatus operates in the second operation mode.

Further, features of the present invention will become apparent from the following description of exemplary embodiments with reference to the attached drawings.

BRIEF DESCRIPTION OF THE DRAWINGS

FIG. 8 is a sequence diagram to be realized when the communication apparatuses 101 and 102 perform direct streaming.

DESCRIPTION OF THE EMBODIMENTS

Exemplary embodiments of the present invention will be described in detail below with reference to the attached drawings. Configurations described in the following exemplary embodiments are mere examples, and the present invention is not limited to the illustrated configurations.

Figure 1:
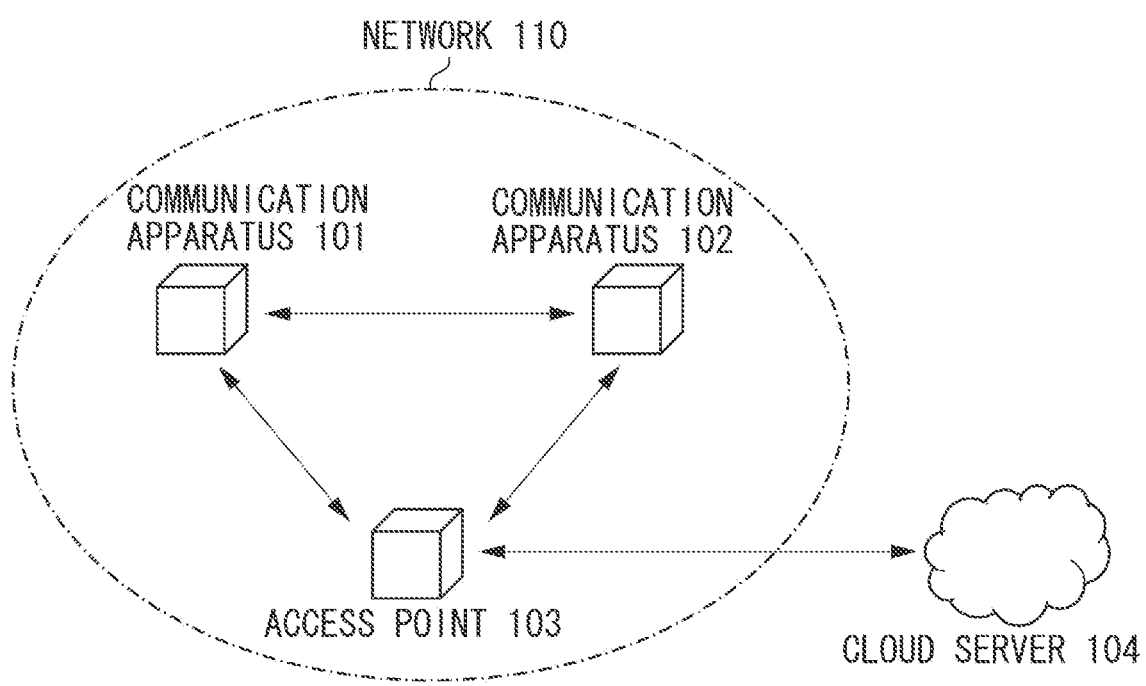
FIG. 1 illustrates a network configuration of a communication system.

FIG. 1 illustrates a network configuration of a communication system according to an exemplary embodiment of the present invention. Devices on a network 110 perform communication using a wireless communication method based on the Institute of Electrical and Electronics Engineers (IEEE) 802.11 series standards.

Communication apparatuses 101 and 102 communicate directly with each other via a network based on the Wi-Fi Display specification (Wi-Fi Miracast® standards). The network between the communication apparatuses 101 and 102 is a wireless network configured based on the Wi-Fi® peer-to-peer (P2P) specification (Wi-Fi Direct® standards). The network is not limited to the above-described network, and the communication apparatuses 101 and 102 can communicate via a wireless network of an infrastructure mode based on the IEEE 802.11 series, which is formed by an access point 103. The access point 103 includes a router function, and the communication apparatuses 101 and 102 can communicate with a cloud server 104 via the access point 103.

The devices can use a communication method based on a different wireless communication method, such as Bluetooth (registered trademark), short-range wireless communication, ultra-wideband (UWB), ZigBee, or multi-band orthogonal frequency division multiplexing (OFDM) alliance (MBOA), in addition to or in place of the wireless communication based on the IEEE 802.11 series standards. Further, examples of short-range wireless communications include near-field communication (hereinafter, "NFC"). Further, examples of UWB include wireless Universal Serial Bus (USB), wireless 1394, and WiMedia networks. Further, a communication method based on a wired communication method such as a wired local area network (LAN) may be used.

Specific examples of the communication apparatus 101 include, but are not limited to, tablets, smartphones, personal computers (PCs), mobile phones, cameras, and video cameras. Further, specific examples of the communication apparatus 102 include, but are not limited to, tablets, smartphones, PCs, mobile phones, televisions, head-mounted displays, projectors, displays, car navigation devices, and output devices such as speakers.

The communication apparatuses 101 and 102 perform mirroring based on the Wi-Fi Display specification with the communication apparatus 101 being a source device and the communication apparatus 102 being a sink device. At this time, the source device and the sink device respectively perform data transmission processing and data reception processing based on the Wi-Fi Display specification. In the mirroring based on the Wi-Fi Display specification, the source device operates as a transmission device for transmitting (streaming) to the sink device via the network a stream of image data and/or audio data as information about the displayed screen and/or reproduced audio. The image data is data obtained by encoding the screen displayed on the source device, and the audio data is data obtained by encoding the audio reproduced by the source device. Further, the sink device operates as a reception device for receiving the stream of image data and/or audio data and reproducing the stream in synchronization with the source device. As a result, the source device and the sink device share the screen displayed on the source device and/or audio reproduced by the source device. Hereinafter, a streaming mode (operation mode of the communication apparatuses 101 and 102) using the mirroring will be referred to as "mirroring mode". The mirroring may be performed not only based on Wi-Fi Display but also based on other specification.

Further, the communication apparatus 101 (source device) and the communication apparatus 102 (sink device) can use a content redirection mode as the streaming mode. In the content redirection mode, the source device causes the sink device to acquire data from an external device other than the source device and causes the sink device to reproduce the acquired data. At this time, the source device transmits to the sink device information required to acquire the data from the external device. The data to be acquired by the sink device is, for example, a content and includes one of image data, document data, audio data, and video data. The data to be acquired by the sink device may further include at least one of software data for reproducing the above-described data, graphical user interface (GUI) data, and metadata.

The required information is information about the content on the external device. The information about the content is, for example, an identifier for identifying the content on the external device, service name, information about the location of the content (uniform resource identifier (URI), uniform resource locator (URL)), and reproduction start time (offset). The content information to be received may be some of the above-described information. The content identifier is an identifier for uniquely determining the content. In the present exemplary embodiment, the communication apparatus 102 receives via the access point 103 the content on the cloud server 104, which is an external device, based on the content information received from the communication apparatus 101 and reproduces the received content.

Further, the communication apparatus 101 (source device) and the communication apparatus 102 (sink device) can also use a direct streaming mode as the streaming mode. In the direct streaming mode, the source device transmits data stored in the source device to the sink device. The sink device receives and reproduces the data. In this case, the source device can transmit the data to the sink device in the original encoded form without decoding and re-encoding the data. The data to be received by the sink device is, for example, a content.

Figure 2:
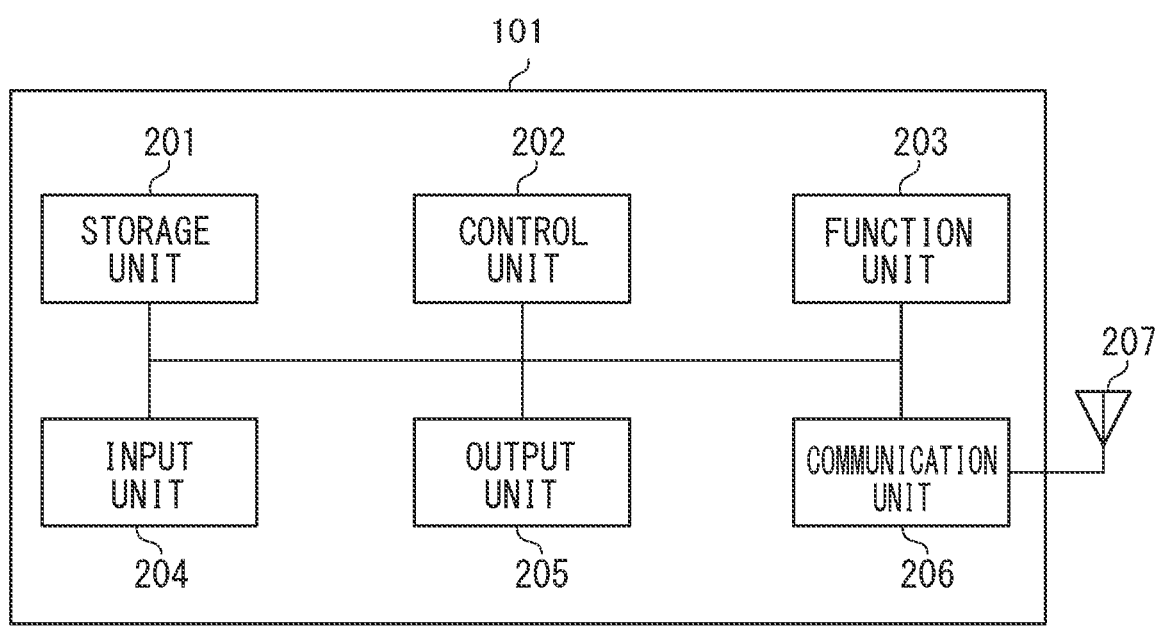
FIG. 2 is a block diagram illustrating a hardware configuration of communication apparatuses 101 and 102.

FIG. 2 illustrates a hardware configuration of the communication apparatus 101.

The communication apparatus 101 includes a storage unit 201, a control unit 202, a function unit 203, an input unit 204, an output unit 205, a communication unit 206, and an antenna 207.

The storage unit 201 includes a memory such as a read-only memory (ROM) or random-access memory (RAM) and stores various types of information such as contents, programs for executing various operations which will be described below, and communication parameters for wireless communication. Besides the memory such as a ROM or RAM, a storage medium such as a flexible disk, hard disk, optical disk, magneto-optical disk, compact disk-ROM (CD-ROM), compact disk recordable (CD-R), magnetic tape, non-volatile memory card, or digital versatile disk (DVD) may be used as the storage unit 201. Further, the storage unit 201 may include a plurality of memories.

The control unit 202 includes a processor such as a central processing unit (CPU) or micro-processor unit (MPU) and executes a program stored in the storage unit 201 to comprehensively control the communication apparatus 101. Further, the control unit 202 executes a program stored in the storage unit 201 to realize a mirroring function, a content redirection function, and a direct streaming function as the source device. As used herein, the mirroring function as the source device refers to the function of transmitting to the sink device image data obtained by capturing a screen displayed on the source device and encoding the captured screen and audio data obtained by encoding reproduced audio. Further, the content redirection function as the source device refers to the function of transmitting to the sink device information required for the sink device to acquire from an external device other than the source device the content to be reproduced at the sink device. Further, the direct streaming function as the source device refers to the function of transmitting to the sink device the content stored in the storage unit 201.

The control unit 202 may cooperate with a program and an operating system (OS) stored in the storage unit 201 to comprehensively control the communication apparatus 101. Further, the control unit 202 can include a plurality of processors such as a multicore processor, and the plurality of processors can comprehensively control the communication apparatus 101.

Further, the control unit 202 controls the function unit 203 to execute predetermined processing such as image capturing and content viewing. The function unit 203 is the hardware for the communication apparatus 101 to execute the predetermined processing. For example, in a case where the communication apparatus 101 is a camera, the function unit 203 is an image capturing unit and performs image capturing processing. At this time, the communication apparatus 101 causes the output unit 205 to display data generated by the image capturing unit on a screen, and the data is transmitted to another communication apparatus by the mirroring function of the control unit 202 to execute mirroring. Alternatively, data stored in the storage unit 201 of the communication apparatus 101 may be displayed on the screen by the output unit 205, and mirroring can be executed as described above.

The input unit 204 accepts various operations from the user. The output unit 205 performs various types of output to the user via a monitor screen and/or speaker. As used herein, the output by the output unit 205 refers to a display on the screen, audio output by the speaker, vibration output, etc. The screen onto which the output unit 205 performs output is the screen of the communication apparatus 101. Alternatively, the screen may be a screen of another apparatus connected with the communication apparatus 101. Further, the input unit 204 and the output unit 205 may be realized by a single module such as a touch panel.

The communication unit 206 controls wireless communication based on the IEEE 802.11 series, wired communication such as a wired LAN, and Internet Protocol (IP) communication. Further, the communication unit 206 controls the antenna 207 to transmit and receive wireless signals for wireless communication. The communication apparatus 101 communicates with the communication apparatus 102 via the communication unit 206 to exchange image data, document data, audio data, video data, etc.

Further, functions of the communication unit 206 may include receiving operation information transmitted from the communication apparatus 102. The operation information is transmitted from the communication apparatus 102 based on the user input back channel (UIBC) function of the Wi-Fi Display specification. When the UIBC function is used, the operation information including the coordinate information based on a user operation on an image is transmitted from the communication apparatus 102 to the communication apparatus 101 to enable operation of the communication apparatus 101 from the communication apparatus 102. In this case, the communication apparatus 101 can treat as input to the input unit 204 the operation information transmitted from the communication apparatus 102.

Further, functions of the communication unit 206 can include the function of receiving control information, which is transmitted from the communication apparatus 102, for controlling the communication apparatus 101. The control information is stored in the communication apparatus 101 and includes reproduction control information as control information about reproduction of the content transmitted to the communication apparatus 102. More specifically, the control information is generated at the communication apparatus 102 based on a user operation accepted via the communication apparatus 102 and is transmitted to the communication apparatus 101. Information indicating an instruction such as an instruction to start, stop, or temporarily suspend content reproduction is included as the reproduction control information. The reproduction control information may further include information indicating an instruction such as an instruction to fast-forward or rewind the content or designate the reproduction position. The communication apparatus 101 having received the control information controls content transmission based on the reproduction control information included in the control information. For example, if a user operation to temporarily suspend the content is accepted via the communication apparatus 102, the communication apparatus 102 generates, as reproduction control information, control information including information indicating an instruction to temporarily suspend the content and transmits the generated control information to the communication apparatus 101. The communication apparatus 101 having received the control information temporarily suspends the content based on the reproduction control information included in the control information.

The control information may include no reproduction control information. The communication apparatus 102 having accepted a user operation may generate control information for controlling the content according to the user operation and transmit the generated control information to the communication apparatus 101. For example, if a user operation to stop the content is input, the communication with the communication apparatus 101 is disconnected to stop receiving the content. In this case, the control information generated at the communication apparatus 102 may need to include at least information indicating an instruction to disconnect the communication with the communication apparatus 101.

The communication apparatus 102 has a similar hardware configuration to that of the communication apparatus 101. The storage unit 201, the function unit 203, the input unit 204, the output unit 205, and the antenna 207 of the communication apparatus 102 are similar to those of the communication apparatus 101, so that description thereof is omitted.

The control unit 202 of the communication apparatus 102 executes a program stored in the storage unit 201 to realize the mirroring function, the content redirection function, and the direct streaming function as the sink device. As used herein, the mirroring function as the sink device refers to the function of receiving, decoding, and reproducing image data obtained by capturing a screen displayed on the source device and encoding the captured screen and/or encoded audio data. Further, the content redirection function as the sink device refers to the function of acquiring content to be reproduced from a device other than the source device based on the information transmitted from the source device and reproducing the acquired content. Further, the direct streaming function as the sink device refers to the function of receiving and reproducing the content transmitted from the source device.

Further, the communication unit 206 of the communication apparatus 102 may include the transmission function of transmitting operation information to the communication apparatus 101. The communication apparatus 102 generates the operation information including the coordinate information from a user operation based on the UIBC function of the Wi-Fi Display specification and transmits the generated operation information to the communication apparatus 101. A user operation input via the input unit 204 of the communication apparatus 102 can be treated as input to the input unit 204 of the communication apparatus 101. Examples of operation information include, but are not limited to, user operation information such as a keyboard operation, mouse operation, touch operation, joystick operation, camera control operation, gesture operation, or remote controller operation.

Further, functions of the communication unit 206 of the communication apparatus 102 may include the function of transmitting control information including reproduction control information to the cloud server 104, which is an external device. The communication apparatus 102 generates control information for controlling the cloud server 104 based on an accepted user operation and transmits the generated control information to the cloud server 104. The reproduction control information may include information indicating an instruction such as an instruction to start, stop, or temporarily suspend content reproduction, an instruction to fast-forward or rewind the content, or an instruction to designate the reproduction position. Further, the reproduction control information included in the control information may include information about the content to be reproduced next to the content that is being currently reproduced by the communication apparatus 102. The cloud server 104 having received the control information controls the transmission of content based on the reproduction control information included in the control information. For example, if a user operation to fast-forward the content is accepted via the communication apparatus 102, the communication apparatus 102 generates control information including, as reproduction control information, information indicating an instruction to fast-forward the content and transmits the generated control information to the cloud server 104. The cloud server 104 having received the control information fast-forwards the content based on the reproduction control information included in the control information.

The control information may include no reproduction control information. The communication apparatus 102 having accepted a user operation may generate control information for controlling the content according to the user operation and transmit the generated control information to the cloud server 104. For example, if a user operation to stop the content is input, the communication with the cloud server 104 is disconnected to stop receiving the content. In this case, the control information generated at the communication apparatus 102 needs to include at least information indicating an instruction to disconnect the communication with the cloud server 104.

Functions of the communication unit 206 of the communication apparatus 102 may include the function of transmitting control information including reproduction control information to the communication apparatus 101. The communication apparatus 102 generates the control information based on the accepted user operation and transmits the generated control information to the communication apparatus 101.

The communication apparatuses 101 and 102 are each an apparatus capable of displaying images and reproducing audio. Alternatively, each of the communication apparatuses 101 and 102 may be an apparatus capable of either one of displaying images and reproducing audio.

Figure 3:
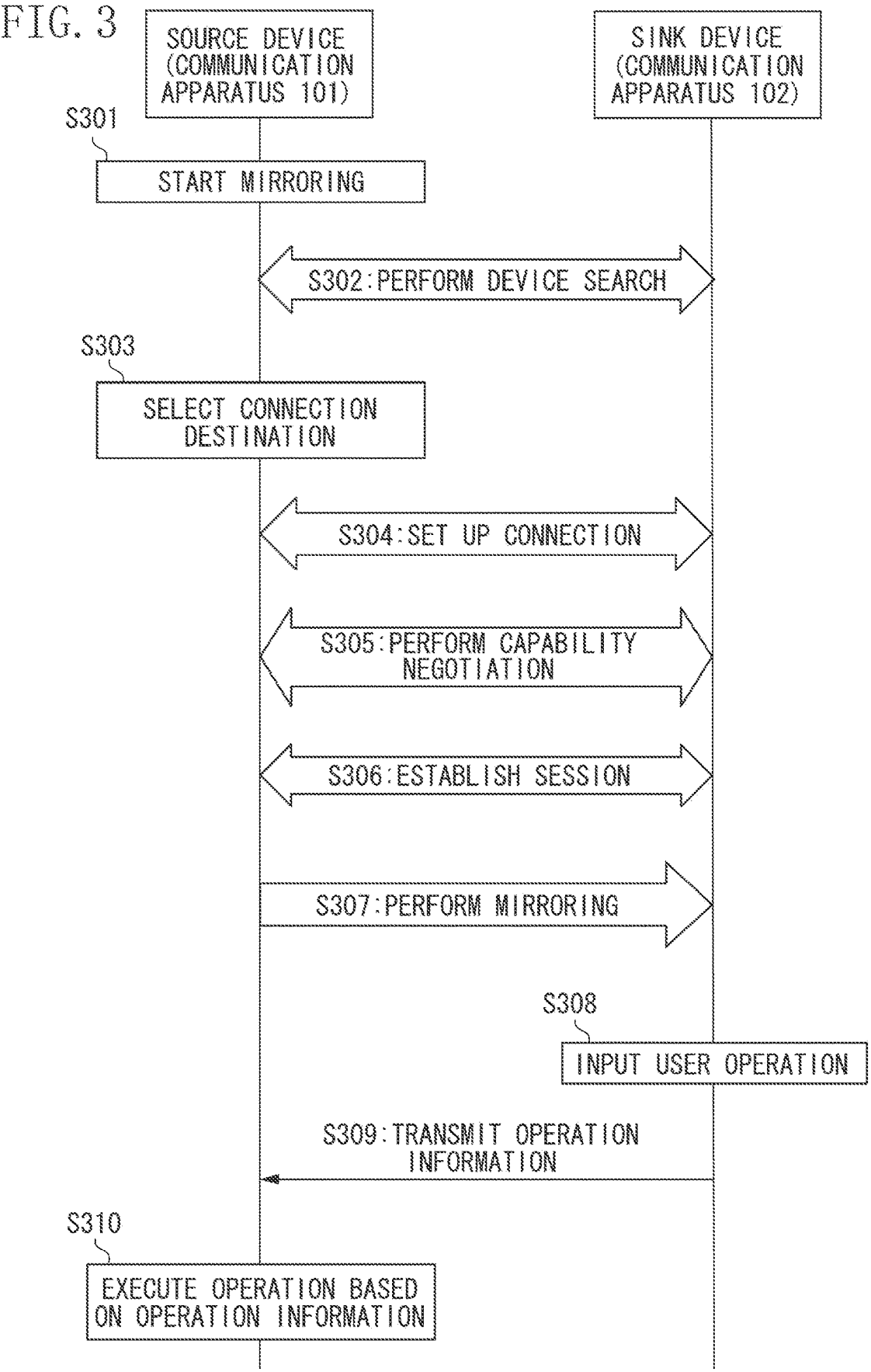
FIG. 3 is a sequence diagram to be realized when the communication apparatuses 101 and 102 perform mirroring.

FIG. 3 is a sequence diagram to be realized when the source device (communication apparatus 101) and the sink device (communication apparatus 102) perform mirroring.

First, in step S301, a mirroring mode start operation is performed on the input unit 204 of the source device by the user. Examples of a start operation include a user operation to press a control button for starting the mirroring mode, a user operation to activate a predetermined application, and a user operation to start reproduction of a predetermined content.

In step S302, if a start operation is performed, a device search is performed between the source device and the sink device. More specifically, the source device transmits as a device detection request a probe request based on the IEEE 802.11 series. The sink device having received the signal transmits as a response to the signal a probe response based on the IEEE 802.11 series. In this way, the source device and the sink device detect each other. Then, in step S303, a list of devices detected at the source device is displayed, and a connection destination device (sink device) is selected from the list of devices.

Alternatively, the sink device may transmit a probe request and the source device may transmit a probe response to detect each other. Further, the selection of a connection destination device may be performed at the sink device.

Further, the signal to be used for a device search may be a wireless signal such as a beacon signal compliant with the IEEE 802.11 series based on the Wi-Fi Display specification. Further, the source device can use NFC, Quick Response (QR) codes (registered trademark), Bluetooth Low Energy (BLE), etc. to detect a connection destination device. For example, if functions of the source device include an NFC function, the pairing of the source device and the sink device can be performed by an NFC touch operation, and communication thereafter can be performed based on the Wi-Fi Display standards. Alternatively, the source device may read a QR code displayed on the sink device and acquire information required to connect to the sink device, and communication thereafter may be performed based on the Wi-Fi Display specification. Further, if functions of the source device include the BLE communication function, the source device can scan a BLE-compatible device, perform pairing with the sink device, and perform communication thereafter based on the Wi-Fi Display specification. Instead of the source device, the sink device may detect a connection destination device (source device).

Next, in step S304, the source device and the sink device set up a connection. More specifically, Wi-Fi Display connection processing is performed, and then Transmission Control Protocol (TCP) connection processing is performed. The Wi-Fi Display connection processing and the TCP connection processing are performed to complete the setting up of the connection.

While the method of establishing a Wi-Fi Display connection may be selected from two methods, i.e., Wi-Fi® P2P method or Tunneled Direct Link Setup (TDLS) method, the establishment is performed based on the Wi-Fi® P2P specification in the present exemplary embodiment.

The details of step S304 will be described here. First, in order to determine a group owner (GO) to play the role of configuring a wireless network, etc., the source device transmits a GO Negotiation Request. This signal includes an intent value of the source device. The device that is determined to be a GO plays a similar role to the role of an access point in Wi-Fi® P2P wireless communication. A device that is not determined to be a GO becomes a client and plays the role of a station.

In response to the GO Negotiation Request, a GO Negotiation Response is transmitted from the sink device. This signal includes an intent value of the sink device. Each apparatus compares the intent values of the sink device and the source device, and the device having a greater intent value becomes a GO. In the present exemplary embodiment, assume that the source device becomes a GO. Alternatively, the sink device may become a GO. Lastly, a GO Negotiation Confirm is transmitted from the source device to the sink device, so that the roles of the source device and the sink device are each determined to be a GO or client. In the present exemplary embodiment, the source device is determined to be a GO, and the sink device is determined to be a client.

Then, parameter information necessary to establish a wireless network connection between the source device and the sink device, such as information about connection and security, is shared using a Wi-Fi Protected Setup™ (WPS) method. Then, the sink device being a client transmits an Association Request to the source device being a GO based on the exchanged parameter information. The source device having received the signal transmits an Association Response in response to the Association Request.

In this way, a Wi-Fi Display connection based on the Wi-Fi® P2P specification, i.e., Wi-Fi® P2P connection, is established between the source device and the sink device. As to the devices to transmit the above-described wireless signals, the roles (GO and client) of the sink device and the source device may be switched. Further, a wireless signal other than those described above may be used to establish a Wi-Fi Display connection. More specifically, a Beacon signal, Reassociation message, P2P Invitation message, Provision Discovery message, etc. may be used.

Then, a TCP connection is established between the source device and the sink device. The source device playing the role of a TCP server and the sink device playing the role of a TCP client perform a three-way handshake to establish the TCP connection.

The Wi-Fi Display connection and the TCP connection are established as described above to complete the setting up of the connection.

Then, in step S305, capability negotiation is performed between the source device and the sink device. The Wi-Fi Display specification specifies that the Real Time Streaming Protocol (RTSP) is to be used for capability negotiation. RTSP is the protocol for controlling streaming. Further, TCP is generally used as a lower-layer transport protocol. In the capability negotiation, predetermined RTSP messages M1 to M4 are exchanged between the source device and the sink device. As a result of the exchange of the RTSP messages, the source device acquires capability information about the sink device, determines parameters to be used, and transmits a notification of the determined parameters to the sink device. The sink device sets the parameters specified in the notification. Specific examples of capability information regarding the screen include information about the compatible resolution of the screen, frame rate, codec. Further, specific examples of capability information regarding the audio include information about the compatible codec, sampling frequency. As a result of the capability negotiation in step S305, the type of a method for encoding image data and/or audio data and parameters such as the resolution and frame rate of images to be used for the mirroring between the source device and the sink device are determined. The capability information to be transmitted and received may be some of the above-described information. For example, as to the resolution of images, first, the message M3 including an inquiry about the resolution of the sink device is transmitted from the source device to the sink device. In response to the message M3, the sink device transmits to the source device a message including information about the resolution of the screen of the sink device. The source device having received the message determines the resolution of images to be transmitted to the sink device based on the resolution of the screen of the sink device.

In the present exemplary embodiment, assume that the message M3 transmitted from the source device when the capability negotiation is performed includes an inquiry about the capability of the UIBC function of the sink device. The message M3 transmitted from the source device is a RTSP GET_PARAMETER message, which is a message used by the source device to inquire about the capability of the sink device. In response to the message M3 transmitted from the source device and including the inquiry about the capability of the UIBC function of the sink device, the sink device transmits a message including information about the capability of the UIBC function of the sink device. In this case, the information about the capability of the UIBC function of the sink device includes, for example, information about whether the UIBC function of the sink device is executable. The information may further include information about the types of user operations supported by the UIBC function of the sink device.

When the source device receives a response to the message M3 from the sink device, the source device transmits the message M4 to the sink device. In the present exemplary embodiment, the message M4 transmitted from the source device includes an instruction to enable the UIBC function. Further, the message M4 may include information regarding the UIBC function such as a port number to be used and types of user operations supported by the UIBC function of the source device. If the sink device receives the message M4, the sink device enables the UIBC function and returns a response "OK" to the source device.

When the capability negotiation is completed, then in step S306, the source device and the sink device establish a Wi-Fi Display session. According to the Wi-Fi Display specification, predetermined RTSP messages M5 to M7 are exchanged between the source device and the sink device to establish a Wi-Fi Display session. As a result of the exchange of the RTSP messages, the setting of the port number to be used, etc. are performed to establish a Wi-Fi Display session. In the establishment of a Wi-Fi Display session, the sink device may set a port number for use in another function such as the content redirection function. Further, a plurality of port numbers may be set.

When the exchange of the RTSP messages up to step S306 is finished, then in step S307, the source device and the sink device perform mirroring. Examples of mirroring processing at the source device include processing such as capturing of a screen displayed on the source device, encoding of captured images, multiplexing, and data transmission. Examples of mirroring processing at the sink device include processing such as data reception, demultiplexing, decoding of captured images, and reproduction of decoded captured images. As a result of execution of the foregoing processing, a stream of image data and/or audio data is transmitted from the source device to the sink device as information about the screen displayed on the source device and/or audio reproduced by the source device.

In the present exemplary embodiment, the UIBC function is enabled when the capability negotiation in step S305 is performed. Alternatively, the UIBC function may be enabled not in step S305 but after the session establishment in step S306 is completed. More specifically, first, the source device transmits the message M3 including no inquiry about the capability of the UIBC function in step S305. The sink device having received the message M3 transmits to the source device a response including no information about the capability of the UIBC function. Then, the source device transmits the message M4, but the sink device having received the message M4 does not enable the UIBC function. Then, after the session establishment in step S306 is completed, the source device may transmit to the sink device the message M3 including an inquiry about the capability of the UIBC function of the sink device. Then, the sink device may transmit to the source device a response to the received message M3. Further, when the source device receives the response to the message M3, the source device may transmit to the sink device the message M4 including an instruction to enable the UIBC function. The sink device having received the message M4 enables the UIBC function and transmits a response "OK" to the source device.

Alternatively, in the capability negotiation in step S305, the source device transmits the message M3 including an inquiry about the capability of the UIBC function of the sink device and receives a response to the message M3. Then, the source device transmits the message M4 including no instruction to enable the UIBC function and receives a response to the message M4 from the sink device, and the capability negotiation in step S305 is completed. Then, after the session establishment in step S306 is completed, a message M14 including an instruction to enable the UIBC function may be transmitted from the source device to the sink device. The sink device having received the message M14 enables the UIBC function and then returns a response "OK" to the source device.

Then, the processing proceeds to step S308, and a user operation is input via the input unit 204 of the sink device. Since the UIBC function of the sink device is currently enabled, the operation information including the coordinate information is generated from the input user operation based on the Wi-Fi Display specification. In step S309, since the current streaming mode is the mirroring mode, the sink device transmits the generated operation information to the source device.

More specifically, first, the sink device generates operation information including information about the version of the UIBC function, information about whether the input user operation is a device-dependent operation, the data packet length, the content of input. An input type identifier, and information about the content of the user operation are included as the content of the input. The input type identifier is information for identifying the input type of the user operation. The type of the user operation includes an operation of moving the mouse, touch operation, click operation, and scroll operation. The content of the user operation includes different information based on each user operation.

For example, in a case where the user operation is a touch operation, operation information including information indicating that the operation is a device-independent operation is generated. Information indicating content of the user operation includes the number of pointers and information about X- and Y-coordinates. The number of pointers is information indicating whether the user operation is a multi-touch. In a case where the touch operation is a single touch, the number of pointers is one. Further, the information about X- and Y-coordinates can be obtained by scaling the coordinate information on the sink device based on the resolution information about the source device.

A specific method for the scaling is as follows. First, the upper left corner of a display unit as the output unit 205 of each of the sink device and the source device is set as the origin (0, 0). A case will be discussed in which the resolutions of the display units of the sink device and the source device are 1536×2048 pixels and 750×1334 pixels, respectively, and the resolution of images to be transmitted from the source device to the sink device is determined to be 1152×2048 pixels in the capability negotiation in step S305, and the sink device displays image data with its upper left corner located at the point (192, 0) with respect to the origin. In this case, if a user touch operation is input at (X, Y)=(300, 400) via the sink device and the input touch operation is a single touch operation, the corresponding coordinates (108, 400) of the touch operation in the image data display region is obtained based on the input coordinates (300, 400) of the touch operation and the start coordinates (192, 0) of the image data display region. Further, the corresponding coordinates (70, 261) of the touch operation on the display area of the source device is obtained based on the resolution of images to be transmitted from the source device to the sink device and the resolution of the display area of the source device. The sink device generates, as the coordinate information, operation information including information that (X, Y)=(70, 261) and the number of pointers=1, and transmits the generated operation information to the source device. The source device having received the operation information executes processing based on the received operation information that a single touch operation is performed on the coordinates (70, 261) with respect to the upper left of the display area of the source device as the origin.

In the present exemplary embodiment, the sink device performs scaling to obtain the coordinate information included in the operation information based on the input coordinates of the user operation, the image data display region, the image resolution, and the resolution of the display area of the source device. Alternatively, the source device may perform scaling to obtain the coordinate information. For example, the sink device obtains the coordinates of the image data in the image data display region based on the input coordinates and transmits the obtained coordinates as the coordinate information to the source device. In this case, the source device having transmitted the coordinate information obtains the coordinate information based on the resolution of the image data transmitted from the source device and the resolution of the display area of the source device, and executes processing. Alternatively, the sink device transmits the input coordinates of the user operation as the coordinate information to the source device. In this case, the source device may perform scaling based on necessary information for the source device. The process of scaling may be performed by one of the sink device and the source device or may be shared by the sink device and the source device.

Further, while the origin is set to the upper left corner of the display unit of each of the sink device and the source device in the present exemplary embodiment, the origin may be set to the upper left corner of the image display region of each of the sink device and the source device. The origin is not limited to those described above and may be any point within the region of the display unit of each of the sink device and the source device. In this case, the scaling method is changed as appropriate according to the position of the origin.

While the touch operation is described as an example of the user operation and the coordinate information scaling method is described in the present exemplary embodiment, the user operation is not limited to the touch operation, and coordinate information may be obtained as described above in a case where the user operation is a click operation on a mouse. For example, in a case where the user operation is a zoom operation, the information indicating content of the user operation includes information about the X- and Y-coordinates, the integer and fractional values of the zoom time.

As described above, the sink device generates the operation information including the coordinate information based on the user operation and transmits the operation information to the source device.

The operation information generated based on the user input may include no coordinate information. For example, in a case where a screen scroll operation is input to the sink device, the sink device generates, as the information indicating the content of the user operation, the operation information including information indicating the vertical and horizontal scroll amounts. Further, for example, if a rotation operation is input to the sink device, the sink device generates, as the information indicating the content of the user operation, the operation information including the integer and fractional values of the rotation amount. In this case, a positive rotation amount indicates an anti-clockwise rotation amount, and a negative rotation amount indicates a clockwise rotation amount. As described above, the sink device may generate operation information including no coordinate information with respect to the input user operation.

Further, examples of a device-dependent operation include a user operation using a keyboard or camera. The sink device generates operation information with respect to such a device-dependent operation that is different from operation information with respect to a device-independent operation. More specifically, information included in the content of input included in the operation information is different. The content of input is generated based on the Human Interface Device Class (HIDC) input body format. The content of input in the operation information based on the device-dependent operation includes information about the input path, input type, and the content of the user operation.

The user operation is not limited to the device-dependent and device-independent operations. For example, the user operation may be a vendor-specific operation. In this case, the sink device generates operation information based on the vendor-specific operation.

In step S310, the source device having received the operation information executes an operation based on the operation information. For example, in a case where the operation information transmitted from the sink device includes information indicating that the user operation is a touch operation and further includes coordinate information, the source device having received the operation information performs processing by determining that the user performs a touch operation on the source device at the coordinates based on the coordinate information, as described in step S309.

As described above, the sequence diagram in FIG. 3 illustrates the process realized by the communication apparatuses 101 and 102 at the time of performing mirroring.

Each of the messages transmitted by the sink device or the source device in this sequence diagram may be transmitted by the device that is the receiver of the message in the present exemplary embodiment. For example, while the source device is the device that is the transmitter of the message M14 in the present exemplary embodiment, the sink device may be the device that is the transmitter of the message M14.

Figure 4:
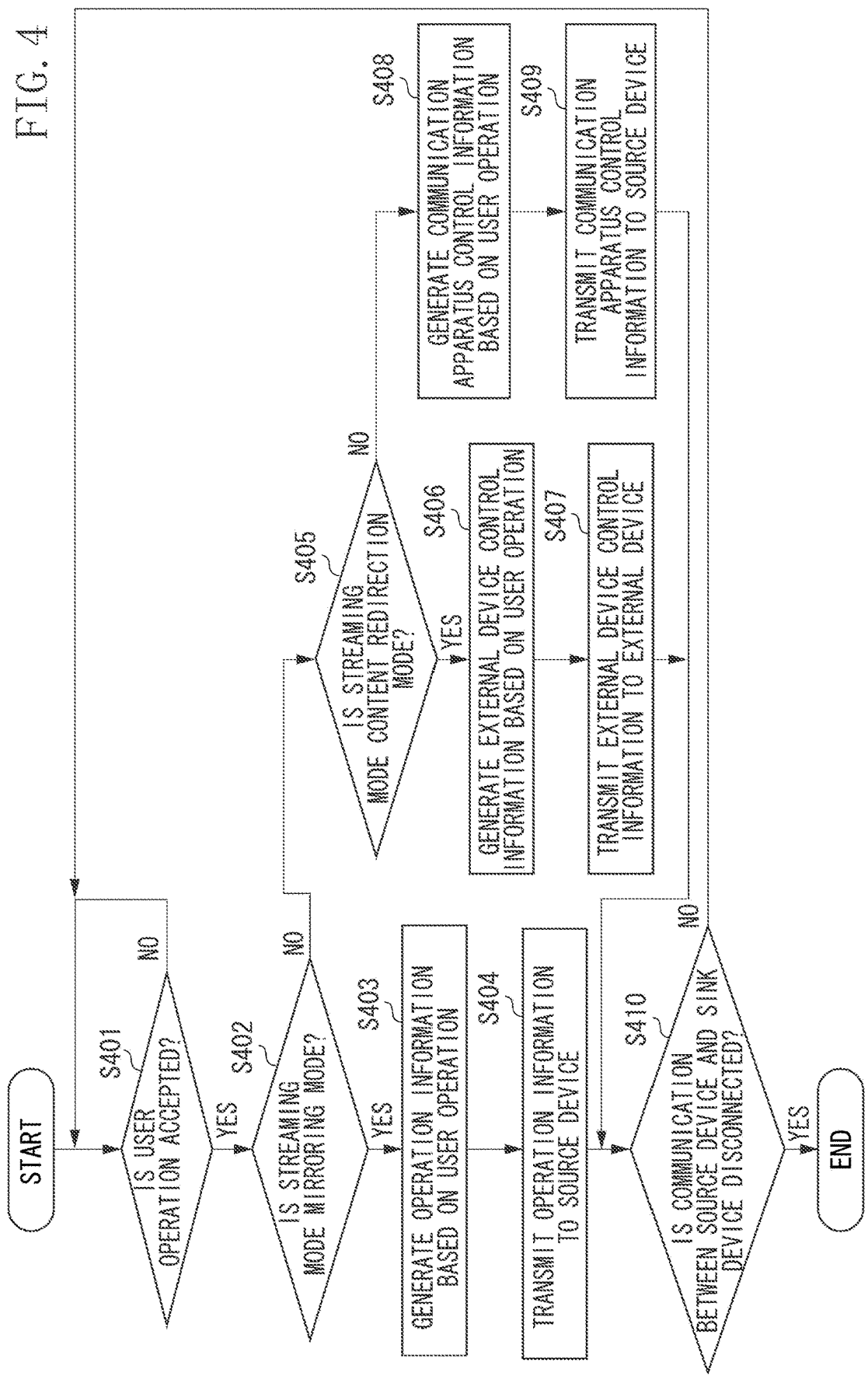
FIG. 4 is a flowchart to be realized when the communication apparatus 102 accepts a user operation.

Next, FIG. 4 is a flowchart illustrating a process to be realized by the control unit 202 reading and executing a program stored in the storage unit 201 when the communication apparatus 102 (sink device) accepts a user operation. The flowchart is started when the mirroring between the source device and the sink device is started in step S307 in FIG. 3. Alternatively, the flowchart may be started when the content redirection or the direct streaming is started. Further, alternatively, the flowchart may be started when a Wi-Fi Display session is established in step S306.

First, in step S401, the sink device determines whether a user operation on the input unit 204 is accepted. In this case, a region on the input unit 204 of the sink device is predetermined, and if the user operation is performed on a region outside the predetermined region, it is possible for the sink device to determine that no user operation is accepted. For example, a reproduction region where an image received from the communication apparatus 101 or the cloud server 104 is to be reproduced on the screen of the touch panel functioning as the input unit 204 and the output unit 205 is set as the predetermined region. Then, if a touch operation is performed on a region outside the reproduction region, the sink device may determine that no user operation is accepted. Alternatively, if a touch operation is performed on a region outside a region where a GUI for reproduction control is displayed, the sink device may determine that no user operation is accepted. In step S401, if the sink device determines that no user operation is accepted (NO in step S401), the processing returns to the determination in step S401.

On the other hand, in step S401, if the sink device determines that a user operation is accepted (YES in step S401), then in step S402, whether the current streaming mode is the mirroring mode is determined. This determination is performed based on the parameter which is exchanged with the source device and from which the streaming mode is identifiable. For example, the determination is performed based on the parameter included in at least one of the messages M3 and M4. If the message M4 exchanged with the source device immediately before the user operation is accepted includes a parameter indicating a start of a direct mode, it is determined that the current streaming mode is not the mirroring mode. If the message M4 includes a parameter indicating a start of the content redirection mode, it is also determined that the current streaming mode is not the mirroring mode. On the other hand, if the message M4 does not include a parameter indicating a start of the direct mode or the content redirection mode, it is determined that the current streaming mode is the mirroring mode. If the message M4 includes a message indicating an end of the direct mode or the content redirection mode, it is also determined that the current streaming mode is the mirroring mode. Alternatively, the determination may be performed based on the information included in the message M3 or M4, such as the resolution of image or encoding method. At least one of the messages M3 and M4 for use in the determination is a message exchanged with the source device after a Wi-Fi Display session is established in step S306 in FIG. 3. Alternatively, at least one of the messages M3 and M4 for use in the determination may be a message exchanged with the source device in step S305 in FIG. 3. The message including the parameter from which the streaming mode is identifiable is not limited to the messages M3 and M4. Further, the determination may be performed based on not the parameter from which the streaming mode is identifiable but an application used by the sink device to receive image data and/or content or a transmission source of content and/or image data. Alternatively, the determination may be performed based on a combination thereof.

If it is determined that the current streaming mode is the mirroring mode (YES in step S402), the processing proceeds to step S403. On the other hand, if it is determined that the current streaming mode is not the mirroring mode (NO in step S402), the processing proceeds to step S405. In step S403, the sink device generates operation information based on the accepted user operation. More specifically, the sink device generates operation information based on the UIBC function of the Wi-Fi Display specification. Then, in step S404, the generated operation information is transmitted to the source device.

Thereafter, in step S410, the sink device determines whether the communication between the source device and the sink device is disconnected. More specifically, the sink device determines whether the Wi-Fi Display session or the Wi-Fi® P2P connection with the source device is disconnected. Alternatively, in a case where a TDLS connection based on TDLS is performed as a Wi-Fi Display connection, whether the TDLS connection in place of the Wi-Fi P2P connection is disconnected is determined. The sink device or the source device issues and transmits a RTSP TEARDOWN message based on the Wi-Fi Display specification to disconnect the Wi-Fi Display session or the Wi-Fi P2P connection. Thus, the determination may be performed based on whether the sink device transmits or receives this message. Alternatively, the determination may be performed based on whether the sink device receives from the source device a message that triggers the sink device to issue a RTSP TEARDOWN message. Further, the determination may be performed based on whether the sink device transmits to the source device a message that triggers the source device to issue a RTSP TEARDOWN message.

If the communication between the source device and the sink device is disconnected (YES in step S410), the flowchart is ended. On the other hand, if the communication between the source device and the sink device is not disconnected (NO in step S410), the processing returns to step S401 to wait for a user operation.

Next, the case where the streaming mode is not the mirroring mode (NO in step S402) will be described below. In this case, the processing proceeds to step S405, and whether the streaming mode is the content redirection mode is determined. This determination is performed based on the parameter included in at least one of the messages M3 and M4 exchanged with the source device in step S305 in FIG. 3 and from which the streaming mode is identifiable, as in step S402. If the streaming mode is the content redirection mode (YES in step S405), the processing proceeds to step S406. On the other hand, if the streaming mode is not the content redirection mode (NO in step S405), the processing proceeds to step S408.

If the streaming mode is the content redirection mode (YES in step S405), then in step S406, the sink device generates external device control information based on the user operation. The user operation is converted from various types of information indicating the operation type, operation position, operation amount, and the like into external device control information including streaming reproduction control information. For example, a user operation such as a mouse click, a key press, or a tap on a touch panel is converted into reproduction control information including information indicating a user instruction to start or stop reproduction of the content, fast-forward the reproduced content. The reproduction control information may further include information indicating an instruction such as an instruction to temporarily suspend the content, an instruction to rewind the content, or an instruction to designate the reproduction position. Further, the reproduction control information may further include information indicating a request for a content to be acquired next to the currently acquired content.

In this case, the sink device may generate the reproduction control information based on the coordinate information on which the user operation is performed. For example, if a tap operation is accepted as a user operation via the sink device, the sink device detects the coordinates at which the tap operation is performed in the display unit of the sink device or the image data display region, as in step S309 in FIG. 3. Then, the sink device generates reproduction control information corresponding to the detected coordinates or coordinate information based on the coordinates. More specifically, in a case where a user interface (UI) indicating a temporary suspension of the content is displayed at the coordinates on the screen of the sink device, the sink device generates reproduction control information indicating the temporary suspension of the content from the tap operation. The sink device transmits control information including the reproduction control information to an external device.

In step S407, the external device control information is transmitted to the cloud server 104, which is an external device. Examples of a protocol for use in the acquisition of content from the external device in the content redirection mode include protocols suitable for streaming reproduction control, such as RTSP, Digital Living Network Alliance (DLNA) (registered trademark) guidelines, Session Initiation Protocol (SIP), Hypertext Transfer Protocol (HTTP) Live Streaming (HLS), Dynamic Adaptive Streaming over HTTP developed by the Moving Picture Experts Group (MPEG-DASH), and Real Time Messaging Protocol (RTMP).

The sink device generates the external device control information based on the protocol for use in the acquisition of content from the external device in the content redirection mode. For example, in a case where the protocol used in the content redirection mode is RTSP, the external device control information to be transmitted from the sink device to the external device is also generated based on RTSP. More specifically, in a case where the sink device accepts a user operation to give an instruction to temporarily suspend the content, the sink device generates a RTSP PAUSE request message as external device control information and transmits the RTSP PAUSE request message to the external device. Further, for example, in a case where the protocol used in the content redirection mode is HTTP, the external device control information to be transmitted from the sink device to the external device is also generated based on HTTP. If the sink device transmits the external device control information, the processing proceeds to step S410.

Next, the case where the streaming mode is neither the mirroring mode nor the content redirection mode (NO in step S405) will be described below. In this case, the streaming mode is the direct streaming mode. In step S408, the sink device generates communication apparatus control information based on the user operation. The user operation is converted from various types of information indicating the operation type, operation position, operation amount, and the like into communication apparatus control information including reproduction control information for controlling streaming reproduction. For example, a user operation such as a mouse click, a key press, or a tap on a touch panel is converted into reproduction control information including information indicating a user instruction to start or stop reproduction of the content, fast-forward the reproduced content. The reproduction control information may further include information indicating an instruction such as an instruction to temporarily suspend the content, an instruction to rewind the content, or an instruction to designate the reproduction position. Further, the reproduction control information may further include information indicating a request for a content to be received following the currently received content. The sink device may detect the coordinates of the accepted user operation and generate reproduction control information based on the coordinates or coordinate information based on the coordinates, as in step S406. In the present exemplary embodiment, RTSP specified by the Wi-Fi Display specification is used as the protocol for use in the direct streaming mode. For example, a message including RTSP PLAY may be generated as communication apparatus control information indicating an instruction to start content reproduction. In step S409, the sink device transmits the generated communication apparatus control information to the source device, and the processing proceeds to step S410.

This flowchart is also applicable to a case where the sink device receives images from a plurality of source devices or cloud servers at the same time and reproduces the images. For example, when a plurality of images received from a plurality of source devices or cloud servers is divided and displayed on the screen of the sink device, if the sink device accepts a user operation, information generated based on the user operation is transmitted to the corresponding source device or cloud server according to the position at which the image is displayed and the position at which the user input operation is performed.

In this flowchart, the current streaming mode is determined in step S402 or S405 after the acceptance of the user operation in step S401. It is not limited thereto, and the current streaming mode may be determined before the acceptance of the user operation in step S401. In this case, after the acceptance of the user operation, the processing may proceed to step S403, S406, or S408 depending on the streaming mode determined in advance.

As described above, FIG. 4 illustrates the process to be realized by the communication apparatus 102 when the user operation is accepted.

In the present exemplary embodiment, the sink device is a device operable in three streaming modes, i.e., the mirroring mode, the content redirection mode, and the direct mode. Alternatively, the sink device only needs to be a device operable in two of the three streaming modes. More specifically, the sink device only needs to be a device operable in the combination of the mirroring mode and the content redirection mode, the combination of the content redirection mode and the direct mode, or the combination of the direct mode and the mirroring mode.

In this case, the flowchart in FIG. 4 is changed as needed. In a case of the sink device operable in the mirroring mode and the content redirection mode, steps S408 and S409 are omitted. Further, step S405 is also omitted. In this case, if it is determined that the current streaming mode is not the mirroring mode (NO in step S402), the processing proceeds to step S406. Alternatively, step S405 may be executed in place of step S402. In this case, if the sink device determines that a user operation is accepted (YES in step S401), the processing proceeds to step S405, and if it is determined that the streaming mode is not the content redirection mode (NO in step S405), the processing proceeds to step S403.

In a case of the sink device operable in the content redirection mode and the direct mode, steps S402 to S404 are omitted. In this case, if the sink device determines that a user operation is accepted (YES in step S401), the processing proceeds to step S405. Further, in step S405, instead of determining whether the streaming mode is the content redirection mode, whether the streaming mode is the direct mode may be determined. In this case, if it is determined that the streaming mode is the direct mode, the processing proceeds to step S408. On the other hand, if it is determined that the streaming mode is not the direct mode, the processing proceeds to step S406.

In a case of the sink device operable in the direct mode and the mirroring mode, steps S405 to S407 are omitted. In this case, if it is determined that the current streaming mode is not the mirroring mode (NO in step S402), the processing proceeds to step S408. Further, in step S402, instead of determining whether the streaming mode is the mirroring mode, whether the streaming mode is the direct mode may be determined. In this case, if it is determined that the streaming mode is the direct mode, the processing proceeds to step S408. On the other hand, if it is determined that the streaming mode is not the direct mode, the processing proceeds to step S403.

Further, while the streaming mode is determined in steps S402 and S405 in the present exemplary embodiment, simply the determination of what the streaming mode is may be performed. More specifically, if the sink device determines that a user operation is accepted (YES in step S401), the sink device determines what the current streaming mode is. The determination is performed based on the parameter from which the streaming mode is identifiable, as in steps S402 and S405. Alternatively, the determination may be performed based on an application used by the sink device to receive image data and/or content or a transmission source of content and/or image data. Alternatively, the determination may be performed based on a combination thereof. In this case, if it is determined that the streaming mode is the mirroring mode, the processing proceeds to step S403. If it is determined that the streaming mode is the content redirection mode, the processing proceeds to step S406. If it is determined that the streaming mode is the direct mode, the processing proceeds to step S408. In this case, the sink device only needs to be operable in at least two of the three streaming modes, as in the above-described case.

Figure 5:
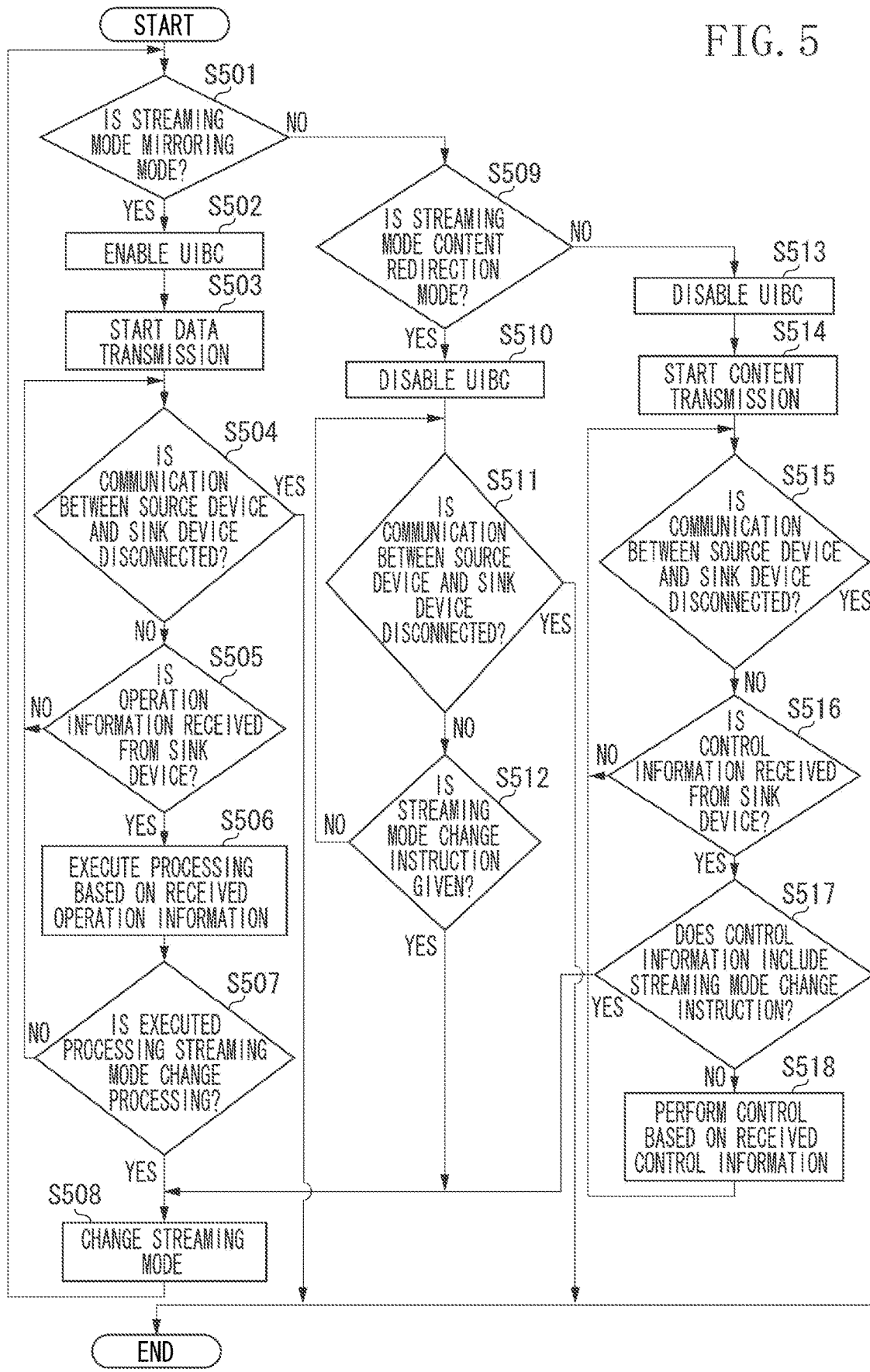
FIG. 5 is a flowchart to be realized when the communication apparatus 101 receives from the communication apparatus 102 operation information or control information based on a user operation.

FIG. 5 illustrates a flowchart of a process to be realized by the control unit 202 reading and executing a program stored in the storage unit 201 when the communication apparatus 101 (source device) receives from the communication apparatus 102 (sink device) the operation information and/or control information based on the user operation. The flowchart is started if the mirroring between the source device and the sink device in step S307 in FIG. 3 is started. Alternatively, the flowchart may be started if the content redirection or the direct streaming is started. Further, alternatively, the flowchart may be started if a Wi-Fi Display session is established in step S306.

First, in step S501, the source device determines whether the streaming mode is the mirroring mode. This determination is performed based on, for example, the parameter which is included in the message exchanged with the sink device in step S305 in FIG. 3 and from which the streaming mode is identifiable. Alternatively, the determination may be performed based on the mirroring start instruction in step S301 in FIG. 3. If the streaming mode is changed in step S508 described below, the parameter which is included in the message exchanged with the sink device in step S508 and from which the streaming mode is identifiable may be used in the determination in step S501.

If the source device determines that the streaming mode is the mirroring mode (YES in step S501), the processing proceeds to step S502. On the other hand, if the source device determines that the streaming mode is not the mirroring mode (NO in step S501), the processing proceeds to step S509. In step S502, the source device enables the UIBC function. Examples of an enabling method include a method in which operation information transmitted from the sink device is not ignored but processed. Alternatively, a RTSP SET_PARAMETER request is transmitted to the sink device to enable the UIBC function. If the sink device having received the request can enable the UIBC function, the sink device returns a response "OK" to the source device. If the source device enables the UIBC function, the processing proceeds to step S503. Step S502 may be skipped if the UIBC function is already enabled and is not disabled thereafter.

In step S503, the source device starts transmission of image data and/or audio data as information about the screen displayed on the source device and/or audio reproduced by the source device, and the processing proceeds step S504. Further, the order of steps S503 and S502 may be switched.

In step S504, whether the communication between the source device and the sink device is disconnected is determined. More specifically, whether the Wi-Fi Display session or the Wi-Fi® P2P connection with the sink device is disconnected is determined. Alternatively, in a case where a TDLS connection based on TDLS is performed as a Wi-Fi Display connection, whether the TDLS connection in place of the Wi-Fi® P2P connection is disconnected is determined. The source device receives from the sink device a RTSP TEARDOWN message based on the Wi-Fi Display specification to disconnect the Wi-Fi Display session or the Wi-Fi® P2P connection. Thus, the determination may be performed based on whether the message is received by the source device. If it is determined that the communication between the source device and the sink device is disconnected (YES in step S504), the flowchart is ended. On the other hand, if it is determined that the communication between the source device and the sink device is not disconnected (NO in step S504), the processing proceeds to step S505.

In step S505, whether operation information based on the user operation is received from the sink device is determined. If no operation information is received by the source device (NO in step S505), the processing returns to step S504. On the other hand, if operation information is received by the source device (YES in step S505), the processing proceeds to step S506.

In step S506, the source device executes processing based on the received operation information. For example, if the operation information including coordinate information is received from the sink device, the position corresponding to the received coordinate information is identified on the display screen of the source device. Then, the source device executes processing on the identified position based on the type of the user operation included in the operation information. For example, if the type of the user operation is a click operation, it is determined that the click operation is performed on the position corresponding to the coordinates.

Next, in step S507, whether the processing executed based on the operation information is to change the streaming mode. For example, the source device receives from the sink device the operation information indicating that a click operation is performed at the coordinates (X, Y). If the scaling is already performed on the coordinates (X, Y), the source device performs processing based on the operation information determining that the click operation is performed at the coordinates (X, Y) in the display area of the source device. Then, for example, a predetermined application is activated at the source device as a result of execution of the processing. In this case, it is determined that the processing executed based on the operation information is the processing to give an instruction to change the streaming mode. Another example of the processing to give an instruction to change the streaming mode is a press of the control button for changing to a predetermined mode. Further, the processing may be processing of selecting a content stored in the storage unit 201 or the processing of selecting a hyperlink of a content on the cloud server. In the present exemplary embodiment, the determination is performed based on whether the processing executed by the source device based on the operation information transmitted from the sink device is to give an instruction to change the streaming mode. The determination is not limited to the above-described determination. Alternatively, a user operation is input via the source device, and the determination is performed based on whether the processing executed based on the user operation is to give an instruction to change the streaming mode.

If the control is not to give an instruction to change the streaming mode (NO in step S507), the processing returns to step S504. On the other hand, if the control is to give an instruction to change the streaming mode (YES in step S507), the processing proceeds to step S508, and the streaming mode is changed. Concurrently with the change of the streaming mode, the UIBC function may be enabled or disabled based on the new streaming mode in step S507. After the streaming mode is changed, the processing returns to step S501.

On the other hand, if the source device determines that the streaming mode is not the mirroring mode (NO in step S501), the processing proceeds to step S509, and whether the streaming mode is the content redirection mode is determined. This determination is performed as in step S501. If it is determined that the streaming mode is not the content redirection mode (NO in step S509), the processing proceeds to step S513. On the other hand, if it is determined that the streaming mode is the content redirection mode (YES in step S509), the processing proceeds to step S510.

In step S510, the source device disables the UIBC function. Examples of a method for disabling the UIBC function include a method in which the operation information transmitted from the sink device is not processed but ignored. Alternatively, a RTSP SET_PARAMETER request may be transmitted to the sink device to disable the UIBC function.

The sink device having received the request returns a response "OK" to the source device if the UIBC function can be disabled. Step S510 may be skipped in a case where the UIBC function is already disabled before the processing proceeds to step S510, such as a case in which the UIBC function is disabled in step S508. Further, step S510 may also be skipped in a case where the UIBC function is not enabled in step S305 in FIG. 3 and thereafter until the processing proceeds to step S510. If the UIBC function is disabled, the processing proceeds to step S511.

In step S511, whether the communication between the source device and the sink device is disconnected is determined, as in step S504. If it is determined that the communication between the source device and the sink device is disconnected (YES in step S511), the flowchart is ended. On the other hand, if it is determined that the communication between the source device and the sink device is not disconnected (NO in step S511), the processing proceeds to step S512.

In step S512, whether a streaming mode change instruction is given is determined. This determination is performed based on, for example, a user operation input to the source device, such as a selection of a content stored in the storage unit 201, activation of a predetermined application, or a press of a control button to change to a predetermined mode. Alternatively, the determination may be performed based on, for example, the state of content reproduction at the sink device such as the state in which the content is reproduced to the end. If it is determined that no streaming mode change instruction is given (NO in step S512), the processing returns to step S511. On the other hand, if it is determined that a streaming mode change instruction is given (YES in step S512), the processing proceeds to step S508, and the streaming mode is changed.

On the other hand, if it is determined that the streaming mode is neither the mirroring mode nor the content redirection mode (NO in step S509), the processing proceeds to step S513. In this case, the streaming mode is the direct streaming mode. In step S513, as in step S510, the source device disables the UIBC function. After the source device disables the UIBC function, the processing proceeds to step S514. In step S514, the source device starts content transmission to the sink device, and the processing proceeds to step S515. The order of steps S514 and S515 may be switched.

In step S515, as in step S504, whether the communication between the source device and the sink device is disconnected is determined. If it is determined that the communication between the source device and the sink device is disconnected (YES in step S515), the flowchart is ended. On the other hand, if it is determined that the communication between the source device and the sink device is not disconnected (NO in step S515), the processing proceeds to step S516.

In step S516, whether control information including reproduction control information based on the user operation is received from the sink device is determined. If the control information is not received by the source device (NO in step S516), the processing returns to step S515. On the other hand, if the control information is received by the source device (YES in step S516), the processing proceeds to step S517.

In step S517, whether the control information received from the sink device includes a streaming mode change instruction is determined. This determination is performed based on whether, for example, reproduction control information indicating an instruction to stop the content is included. Alternatively, control information generated based on a press of the control button on the sink device by the user to activate a predetermined application or change to a predetermined mode may be determined as control information including a streaming mode change instruction. Further, alternatively, the control information may be control information generated based on a selection of a hyperlink of a content on the cloud server by the user on the sink device. These user operations may be executed via not the sink device but the source device. In this case, the source device may perform the determination based on the execution of the user operations. Further, alternatively, the determination may be performed based on the state of content reproduction at the sink device, such as the state in which the content is reproduced to the end at the sink device is determined as a streaming mode change instruction.

If it is determined that the control information received from the sink device includes a streaming mode change instruction (YES in step S517), the processing proceeds to step S508, and the streaming mode is changed. On the other hand, if it is determined that the control information received from the sink device does not include a streaming mode change instruction (NO in step S517), the processing proceeds to step S518, and control is performed based on the received control information. For example, if the received control information indicates a temporary suspension of the content, the source device temporarily suspends the content streaming to the sink device. If the control based on the received control information is performed, the processing returns to step S515.

As described above, the flowchart in FIG. 5 illustrates the process realized by the source device when the operation information or control information based on the user operation is received from the sink device.

Figure 6:
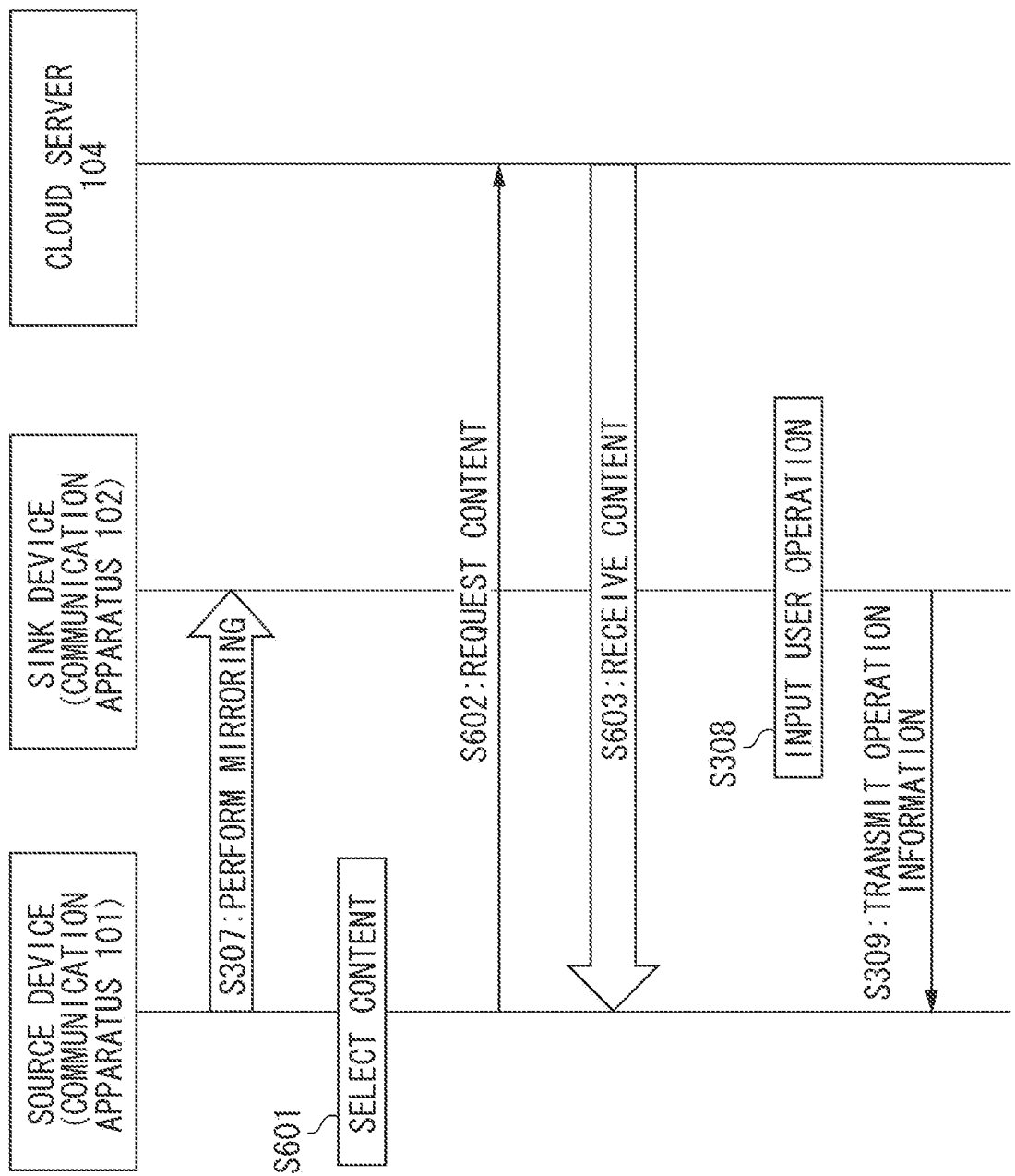
FIG. 6 is a sequence diagram to be realized when the communication apparatuses 101 and 102 and a cloud server 104 perform mirroring.
Figure 7:
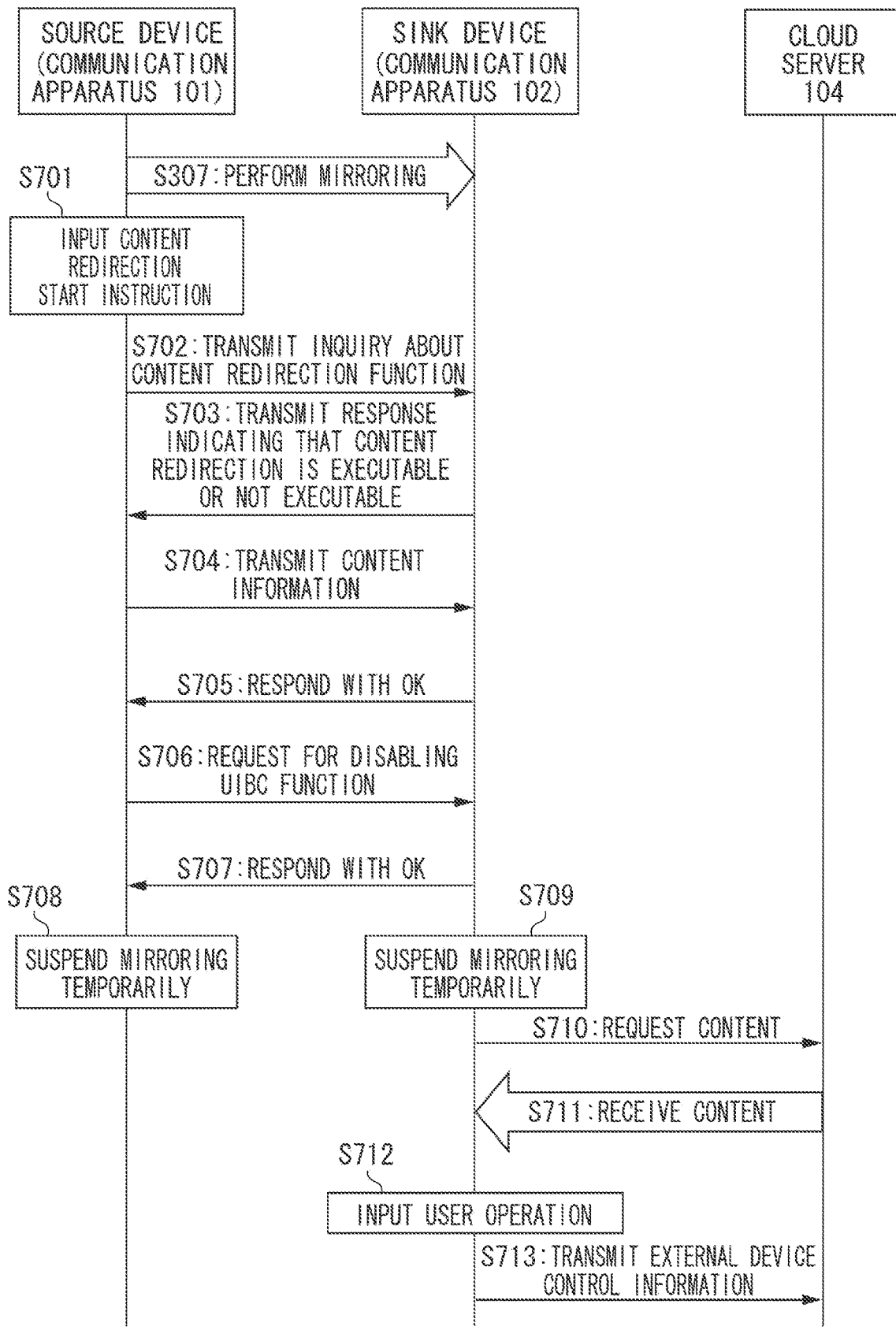
FIG. 7 is a sequence diagram to be realized when the communication apparatuses 101 and 102 and the cloud server 104 perform content redirection.

The sink device and the source device in the sequence diagrams in FIGS. 6 to 8 respectively operate according to the flowcharts in FIGS. 4 and 5.

FIG. 6 illustrates a sequence diagram to be realized when the source device (communication apparatus 101), the sink device (communication apparatus 102), and the external device (cloud server 104) perform mirroring. This sequence diagram illustrates a process in which the source device acquires content stored in the external device and mirrors the content with respect to the sink device. Prior to the sequence diagram, the processing in steps S301 to S306 in FIG. 3 are already completed. Further, the UIBC function is already enabled in step S305 in FIG. 3.

In step S307, mirroring is performed between the source device and the sink device. In step S601, the user of the source device selects a content to be viewed. The content selection is performed by, for example, selecting a hyperlink of a content. In step S602, the source device transmits to the external device a request for the selected content. Then, in step S603, the source device receives the content from the external device. Since the mirroring in step S307 is currently performed, the content is also displayed on the sink device.

In this case, in step S308, if the sink device receives a user operation, then in step S309, operation information based on the user operation is generated and transmitted to the source device. The source device controls itself based on the received operation information to also control the reception of content from the external device.

As described above, the sequence diagram in FIG. 6 illustrates the process realized when the source device, the sink device, and the external device perform mirroring.

Next, FIG. 7 illustrates a sequence to be realized when the source device (communication apparatus 101), the sink device (communication apparatus 102), and the external device (cloud server 104) perform content redirection. Prior to the sequence diagram, the processing in steps S301 to S306 in FIG. 3 are already completed. Further, the UIBC function is already enabled in step S305 in FIG. 3.

In step S307, mirroring is executed between the source device and the sink device. In this case, in step S701, a content redirection start instruction is input to the source device by the user. The content redirection start instruction is a user operation such as activation of a predetermined application or a press of a control button. Alternatively, the user operation may be a selection of a hyperlink of a content on the cloud server. Further, the user operations may be performed via not the source device but the sink device.

In step S702, the source device transmits to the sink device an inquiry about the content redirection function. The inquiry about the content redirection function includes a request for information about an application capable of executing content redirection among the applications of the sink device. The information about the application is, for example, a name, type, and issuer of the application. Further, an inquiry about whether the sink device can perform content redirection may be included. Alternatively, at least one of a content redirection start instruction and content information may be included.

If the sink device receives the inquiry about the content redirection function, then in step S703, the sink device transmits to the source device a response indicating that the content redirection is executable or not executable. In this case, whether the sink device can perform content redirection is determined based on whether the content redirection is supported by any of the applications in the sink device. Alternatively, the determination may be performed based on whether the sink device is set to be allowed to perform content redirection. Further alternatively, the determination may be performed based on a state of connection between the sink device and the source device or a state of connection between the sink device and the external device. Further, these determination criteria may be used in combination.

The sink device having performed the determination transmits to the source device a response indicating that the content redirection is executable or not executable. As the response, a notification "OK" or "NG" is transmitted based on the determination result. Further, in the case in which the notification "NG" is transmitted as the response, the notification may include information about a reason why the content redirection is not executable, information about an application capable of executing content redirection among the applications of the sink device. In this sequence, suppose that a notification "OK" is transmitted as the response to the source device.

Then, in step S704, the source device transmits content information to the sink device. If the sink device receives the content information, then in step S705, the sink device transmits a response "OK" to the source device. Further, in step S706, the source device transmits a request for disabling the UIBC function. In step S707, the sink device having received the request for disabling the UIBC function disables the UIBC function and transmits a response "OK" to the source device.

In steps S708 and S709, the source device and the sink device prepared for content redirection temporarily suspend the mirroring that is being executed. When the content redirection is executed while the mirroring is executed, temporarily suspending the mirroring processing reduces the load of mirroring processing on the sink device and reduces power consumption. In this case, the communication between the source device and the sink device is maintained.

In step S710, the sink device transmits a content request to the external device based on the content information received from the source device. In step S711, the external device having received the request transmits the content to the sink device. In this case, in step S712, if the sink device accepts a user operation, then in step S713, the sink device generates external device control information based on the user operation and transmits the generated external device control information to the external device.

As described above, the sequence diagram in FIG. 7 illustrates the process realized by the source device, the sink device, and the external device when the content redirection is performed.

In this sequence diagram, the content redirection is performed after the mirroring in step S307 is executed. Alternatively, the content redirection may be performed without executing mirroring. More specifically, the content redirection start instruction in step S701 may be input in place of the mirroring start operation by the user in step S301 in FIG. 3. In this case, after the processing in step S701, the processing in steps S301 to S306 are executed, and the processing in step S702 is executed. Thereafter, steps S708 and S709 are skipped. In step S305, the UIBC function does not have to be enabled. In this case, steps S706 and S707 are skipped. Further, the processing in steps S702 to S704 may be executed in step S305.

FIG. 8 illustrates a sequence to be realized when the source device (communication apparatus 101) and the sink device (communication apparatus 102) perform direct streaming. Prior to the sequence, the processing in steps S301 to S306 in FIG. 3 are completed. Further, the UIBC function is enabled in step S305 in FIG. 3.

In step S307, mirroring is executed between the source device and the sink device. In this case, in step S801, a direct streaming start instruction is input to the source device by the user. The direct streaming start instruction is a user operation such as activation of a predetermined application or a press of a control button. Alternatively, the direct streaming start instruction may be a selection of a content on the source device. Further, the user operations may be performed via not the source device but the sink device.

In step S802, a mode change request for changing to the direct streaming mode is transmitted from the source device to the sink device. The mode change request includes information about the moving image format and/or audio format for use in direct streaming. Further, information for activating the direct streaming mode may be included.

If the sink device receives the request, then in step S803, the sink device transmits a response "OK" to the source device if the sink device supports the moving image format and/or audio format included in the request. In step S804, the source device transmits a request for disabling the UIBC function. In step S805, the sink device having received the request for disabling the UIBC function disables the UIBC function and transmits a response "OK" to the source device.

In step S806, the source device having received the response "OK" transmits to the sink device the content stored in the source device. In this case, in step S807, if the sink device accepts a user operation, then in step S808, the sink device generates communication apparatus control information based on the user operation and transmits the communication apparatus control information to the source device.

As described above, the sequence diagram in FIG. 8 illustrates the process realized by the source device and the sink device when the direct streaming is performed.

In this sequence diagram, the content redirection is executed after the mirroring in step S307 is executed. Alternatively, the content redirection may be executed without executing the mirroring. More specifically, the direct streaming start instruction in step S801 may be input in place of the mirroring start operation by the user in step S301 in FIG. 3. In this case, after the processing in step S801, the processing in steps S301 to S306 are executed, and the processing in step S802 is executed. In step S305, the UIBC function does not have to be enabled. In this case, steps S804 and S805 are skipped. Further, the processing in steps S802 and S803 may be performed in step S305.

In the present exemplary embodiment, the case where the streaming mode is changed from the mirroring mode to the content redirection mode and the case where the streaming mode is changed from the mirroring mode to the direct mode are described. Besides the above-described cases, the streaming mode may be changed from the direct mode or the content redirection mode to another streaming mode.

For example, in a case of changing from the direct mode or the content redirection mode to the mirroring mode, a mirroring mode start operation is performed on the source device by the user as an instruction to change to the mirroring mode. The mirroring mode start operation is as in step S301 in FIG. 3. Alternatively, the mirroring mode start operation may be performed at the sink device. Further alternatively, the streaming mode may be changed based on an operation performed to end the content redirection mode or the direct mode. Further, the streaming mode may be changed based on a state of content reproduction at the sink device, such as a case in which the content is reproduced to the end in the direct mode or the content redirection mode. Further alternatively, the streaming mode may be changed based on the fact that an instruction to stop the content reproduced at the sink device is given.

Further, the change from the direct mode to the content redirection mode is performed based on the fact that a user operation such as activation of a predetermined application or a press of the control button is input to the source device. Alternatively, the user operation may be a selection of a hyperlink of a content on the cloud server. Further, the user operations may be performed via not the source device but the sink device.

The change from the content redirection mode to the direct mode is performed based on the fact that a user operation such as activation of a predetermined application or a press of the control button is input to the source device. Alternatively, the user operation may be a selection of a content on the source device.

In the present exemplary embodiment, the control information transmitted from the sink device when the content redirection mode or the direct mode is performed includes reproduction control information including information about a user instruction such as a user instruction to start or stop content reproduction or a user instruction to fast-forward the content. Further, the reproduction control information may further include information indicating an instruction such as an instruction to temporarily suspend or rewind the content or the reproduction position designation. Information to be included in the control information is not limited to the above-described information, and any necessary information may be included based on the received content and user operation. For example, if the sink device receives a web page including image data and the user clicks a hyperlink, the control information includes a call to a reference destination based on a URL included in the hyperlink.

Further, in the present exemplary embodiment, if the sink device operates in the mirroring mode and a user operation is accepted, operation information including coordinate information is transmitted to the source device. The present exemplary embodiment is not limited to the above-described case, and operation information including coordinate information indicating the position of a mouse pointer may be transmitted periodically to the source device when the sink device operates in the mirroring mode even if no user operation (e.g., click operation) is accepted. On the other hand, when the sink device operates in the content redirection mode or the direct mode and no user operation is accepted, control information does not have to be transmitted to the external device and the source device.

The sequence diagrams of the communication apparatus 101 in FIGS. 3, 6, 7, and 8 are realized by the control unit 202 reading and executing a program stored in the storage unit 201 of the communication apparatus 101. Further, the sequence diagrams of the communication apparatus 102 are realized by the control unit 202 reading and executing a program stored in the storage unit 201 of the communication apparatus 102. Further, at least some of or all of the sequence diagrams in FIGS. 3, 6, 7, and 8 may be realized by hardware. In the case of realizing the sequence diagrams with hardware, for example, a predetermined compiler is used to generate a dedicated circuit on a field programmable gate array (FPGA) from the programs for realizing the respective steps, and the dedicated circuit may be used. Further, a gate array circuit may be formed as in the case of the FPGA to realize the sequence diagrams as hardware. Further, the sequence diagrams may be realized by an application-specific integrated circuit (ASIC). The same applies to the flowcharts of the communication apparatuses 102 and 101 in FIGS. 4 and 5, respectively.

The steps in the sequence diagrams and flowcharts in FIGS. 3 to 8 may be shared and performed by a plurality of CPUs (not illustrated) or apparatuses (not illustrated). In the case where the steps are shared and performed by a plurality of apparatuses, the source device operates as a source system, and the sink device operates as a sink system.

While an exemplary embodiment is described in detail above, the present invention may be implemented as, for example, a system, apparatus, method, program, or recording medium (storage medium). More specifically, the present invention is applicable to a system including a plurality of devices (e.g., host computers, interface devices, image capturing devices, and web applications) or an apparatus including a single device.

The present invention may be realized by a process in which a program for realizing one or more functions of the above-described exemplary embodiment is supplied to a system or apparatus via a network or storage medium and one or more processors of a computer of the system or apparatus read and execute the program. Further, the present invention can also be realized by a circuit (e.g., ASIC) which realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a communication apparatus to which a user operation is input can transmit appropriate information based on whether the communication apparatus receives data based on an image displayed on another communication apparatus or data stored in the other communication apparatus or an external device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-104186, filed May 26, 2017, which is hereby incorporated by reference herein in its entirety.

What is claimed is:

1. An apparatus comprising:
one or more processors; and
one or more memories storing instructions that, when executed by the one or more processors, cause the apparatus to:
perform communications, wherein, in a first operation mode, the apparatus receives, from another apparatus, first data related to an image displayed at the another apparatus, and wherein, in a second operation mode, the apparatus receives second data different from the first data;
display an image on a display of the apparatus,
wherein, in the first operation mode, the apparatus displays on the display, by using the received first data, an image corresponding to the image displayed at the another apparatus,
wherein, in the second operation mode, the apparatus displays an image on the display by using the received second data;
determine whether the apparatus is operating in the first operation mode or the second operation mode;
accept a user operation related to the image displayed on the display; and
transmit coordinate information in a User Input Back Channel (UIBC) compliant data format to the another apparatus according to the accepted user operation in a case where it is determined that the apparatus is operating in the first operation mode, and transmit control information in a second data format different from the UIBC compliant data format to an external apparatus that is a source of the second data in a case where it is determined that the apparatus is operating in the second operation mode,
wherein the coordinate information is related to a coordinate indicated by the accepted user operation, and
wherein the control information is for controlling a function requested by the apparatus to be performed at the external apparatus that is the source of the second data and the control information does not include the coordinate information.

2. The apparatus according to claim 1, wherein the execution of the instructions further causes the apparatus to:
in the case where it is determined that the apparatus is operating in the first operation mode, generate the coordinate information in the UIBC compliant data format based on a coordinate specified by the user operation and a resolution of the source of the first data,
wherein the coordinate information in the UIBC compliant data format is information in which a top-left corner of a display region of the another apparatus that is the source of the first data is represented as a coordinate origin.

3. The apparatus according to claim 1,
wherein in the case where it is determined that the apparatus is operating in the second operation mode,
if the apparatus receives the second data, the apparatus transmits the control information to the external apparatus that is the source of the second data.

4. The apparatus according to claim 1,
wherein the control information contains at least one of pieces of information indicating to start, stop, fast-forward, rewind, temporarily suspend reproduction of playback of the second data, or a starting position of the second data.

5. The apparatus according to claim 1, wherein in the case where it is determined that the apparatus is operating in the first operation mode or the second operation mode, the apparatus displays an image based on the first data or the second data in a display region included in the apparatus.

6. The apparatus according to claim 1, wherein in the case where it is determined that the apparatus is operating in the first operation mode, the apparatus transmits a coordinate specified by the user operation and a resolution of the display of the apparatus, as the coordinate information in the UIBC compliant data format,
wherein the coordinate information is information in which a top-left corner of a display region of the apparatus is represented as a coordinate origin.

7. The apparatus according to claim 1, wherein in the case where the apparatus operates in the first operation mode, the apparatus reproduces audio reproduced by the another apparatus that is the source of the first data by further receiving data related to the audio.

8. The apparatus according to claim 1, wherein the second data includes at least one of document data, audio data, image data, or video data.

9. The apparatus according to claim 1, wherein the second operation mode is a mode for displaying an image based on the second data stored in the another apparatus different from the image displayed at the another apparatus, on the display of the apparatus or a mode for displaying an image based on content data provided by an external server according to an instruction from the another apparatus, on the display of the apparatus.

10. The apparatus according to claim 9, wherein the instruction acquired from the another apparatus includes an identifier of the second data.

11. The apparatus according to claim 1, wherein the first operation mode is a mirroring mode of Miracast®.

12. The apparatus according to claim 1, wherein the apparatus communicates with at least one of the another apparatus or the external apparatus via a wireless network conforming to an Institute of Electrical and Electronics Engineers (IEEE) 802.11 series standard.

13. The apparatus according to claim 1, wherein the apparatus communicates with the another apparatus via a wireless network conforming to a direct wireless connection standard.

14. A method of controlling an apparatus, the method comprising:
performing communications, wherein, in a first operation mode, the apparatus receives, from another apparatus, first data related to an image displayed at the another apparatus, and wherein, in a second operation mode, the apparatus receives second data different from the first data;
displaying an image on a display of the apparatus,
wherein, in the first operation mode, the apparatus displays on the display, by using the received first data, an image corresponding to the image displayed at the another apparatus,
wherein, in the second operation mode, the apparatus displays an image on the display by using the received second data;
determining whether the apparatus is operating in the first operation mode or the second operation mode;
accepting a user operation related to the image displayed on the display; and
transmitting coordinate information in a User Input Back Channel (UIBC) compliant data format to the another apparatus according to the accepted user operation in a case where it is determined that the apparatus is operating in the first operation mode, and transmitting control information in a second data format different from the UIBC compliant data format to an external apparatus that is a source of the second data in a case where it is determined that the apparatus is operating in the second operation mode,
wherein the coordinate information is related to a coordinate indicated by the accepted user operation, and
wherein the control information is for controlling a function requested by the apparatus to be performed at the external apparatus that is the source of the second data and the control information does not include the coordinate information.

15. A method of controlling an apparatus, the method comprising:
performing communications, wherein, in a first operation mode, the apparatus receives, from another apparatus, first data related to an image displayed at the another apparatus, and wherein, in a second operation mode, the apparatus receives second data different from the first data;
displaying an image on a display of the apparatus,
wherein, in the first operation mode, the apparatus displays on the display, by using the received first data, an image corresponding to the image displayed at the another apparatus,
wherein, in the second operation mode, the apparatus displays an image on the display by using the received second data;
determining whether the apparatus is operating in the first operation mode or the second operation mode;
accepting a user operation related to the image displayed on the display; and
transmitting coordinate information in a User Input Back Channel (UIBC) compliant data format to the another apparatus according to the accepted user operation in a case where it is determined that the apparatus is operating in the first operation mode, and transmitting control information in a second data format different from the UIBC compliant data format to an external apparatus that is a source of the second data in a case where it is determined that the apparatus is operating in the second operation mode,
wherein the coordinate information is related to a coordinate indicated by the accepted user operation, and
wherein the control information is for controlling a function requested by the apparatus to be performed at the external apparatus that is the source of the second data and the control information does not include the coordinate information.

16. The apparatus according to claim 1, wherein in the case where it is determined that the apparatus is operating in the first operation mode, the coordinate information in the UIBC compliant data format according to the accepted user operation is transmitted to the another apparatus, and the control information in the second data format according to the accepted user operation is not transmitted to the another apparatus.

17. The apparatus according to claim 1, wherein the execution of the instructions further causes the apparatus to:
set an operation mode associated with UIBC to be enable or disable,
wherein, in a case where the operation mode is set to be disable, the coordinate information in the UIBC compliant data format is not transmitted to outside of the apparatus.

18. The apparatus according to claim 1, wherein the second operation mode is a direct streaming mode of Miracast®.

* * * * *